(12) United States Patent
Holmberg et al.

(10) Patent No.: US 9,737,859 B2
(45) Date of Patent: Aug. 22, 2017

(54) PROCESS FOR IMPROVED WATER FLUX THROUGH A TFC MEMBRANE

(71) Applicants: LG NANOH2O, INC., El Segundo, CA (US); LG CHEM, LTD., Daejeon (KR)

(72) Inventors: Brett Anderson Holmberg, Redondo Beach, CA (US); Jeff Koehler, Pasadena, CA (US); Hyung Joon Jeon, Daejeon (KR)

(73) Assignees: LG NANOH2O, INC., El Segundo, CA (US); LG CHEM, LTD., Daejeon (KR)

( * ) Notice: Subject to any disclaimer, the term of this patent is extended or adjusted under 35 U.S.C. 154(b) by 117 days.

(21) Appl. No.: 14/992,821

(22) Filed: Jan. 11, 2016

(65) Prior Publication Data

US 2017/0197182 A1   Jul. 13, 2017

(51) Int. Cl.
*B01D 67/00* (2006.01)
*B01D 71/56* (2006.01)
(Continued)

(52) U.S. Cl.
CPC ......... *B01D 67/0088* (2013.01); *B01D 61/02* (2013.01); *B01D 63/10* (2013.01);
(Continued)

(58) Field of Classification Search
None
See application file for complete search history.

(56) References Cited

U.S. PATENT DOCUMENTS 3,133,132 A   5/1964   Loeb et al.
3,133,137 A   5/1964   Loeb et al.
(Continued)

FOREIGN PATENT DOCUMENTS

CA   2388500   4/2001
CA   2600481   9/2006
(Continued)

OTHER PUBLICATIONS

Alexandre et al., "Polymer-layered silicate nanocomposites: preparation, properties and uses of a new class of materials," Materials Science and Engineering, 28 (2000):1-63.
(Continued)

*Primary Examiner* — Krishnan S Menon
(74) *Attorney, Agent, or Firm* — Dentons US LLP (57) ABSTRACT

Provided is a process for preparation of a highly permeable thin film composite membranes for nanofiltration, reverse osmosis, and forward osmosis, particularly for reverse osmosis of brackish water. The process includes treating a prepared TFC membrane containing a discrimination layer on a frontside, a support layer, and a felt layer on the backside by contacting the backside of TFC membrane with a solution containing a pore protection agent that includes a tertiary amine salt of camphorsulfonic acid prior to or at the same time as contacting the frontside of the membrane with a solution containing a coating agent and drying the membrane. Also provided are reverse osmosis membranes prepared in accord with the method, and modules containing the highly permeable thin film composite membranes.

10 Claims, 3 Drawing Sheets

(51) Int. Cl.

| | | |
|---|---|---|
| *B01D 69/12* | (2006.01) | |
| *C02F 103/08* | (2006.01) | |
| *B01D 61/02* | (2006.01) | |
| *B01D 63/10* | (2006.01) | |
| *B01D 69/10* | (2006.01) | |
| *B01D 71/48* | (2006.01) | |
| *B01D 71/68* | (2006.01) | |
| *B01D 69/02* | (2006.01) | |
| *C02F 1/44* | (2006.01) | |

(52) U.S. Cl.
CPC ..... *B01D 67/0002* (2013.01); *B01D 67/0095* (2013.01); *B01D 69/02* (2013.01); *B01D 69/10* (2013.01); *B01D 69/12* (2013.01); *B01D 71/48* (2013.01); *B01D 71/56* (2013.01); *B01D 71/68* (2013.01); *C02F 1/441* (2013.01); *C02F 2103/08* (2013.01)

(56) References Cited

U.S. PATENT DOCUMENTS

| | | |
|---|---|---|
| 3,260,691 A | 7/1966 | Lavin et al. |
| 3,351,244 A | 11/1967 | Zandberg et al. |
| 3,367,504 A | 2/1968 | Westmoreland |
| 3,417,870 A | 12/1968 | Bray |
| 3,480,588 A | 11/1969 | Lavin et al. |
| 3,567,632 A | 3/1971 | Richter et al. |
| 3,597,393 A | 8/1971 | Bach et al. |
| 3,615,024 A | 10/1971 | Michaels |
| 3,619,424 A | 11/1971 | Bianchard et al. |
| 3,642,707 A | 2/1972 | Frazer |
| 3,648,845 A | 3/1972 | Riley |
| 3,663,510 A | 5/1972 | Peterson |
| 3,687,842 A | 8/1972 | Credali et al. |
| 3,690,811 A | 9/1972 | Horning |
| 3,692,740 A | 9/1972 | Suzuki et al. |
| 3,696,031 A | 10/1972 | Credali et al. |
| 3,710,945 A | 1/1973 | Dismore |
| 3,744,642 A | 7/1973 | Scala et al. |
| 3,791,526 A | 2/1974 | Stana et al. |
| 3,878,109 A | 4/1975 | Ikeda et al. |
| 3,904,519 A | 9/1975 | McKinney et al. |
| 3,906,250 A | 9/1975 | Loeb |
| 3,920,612 A | 11/1975 | Stephens |
| 3,926,798 A | 12/1975 | Cadotte |
| 3,951,815 A | 4/1976 | Wrasidlo |
| 3,993,625 A | 11/1976 | Kurihara et al. |
| 3,996,318 A | 12/1976 | Van Heuven |
| 4,005,012 A | 1/1977 | Wrasidlo |
| 4,020,142 A | 4/1977 | Davis et al. |
| 4,039,440 A | 8/1977 | Cadotte |
| 4,048,144 A | 9/1977 | Stephens |
| 4,051,300 A | 9/1977 | Klein et al. |
| 4,060,488 A | 11/1977 | Hoover et al. |
| 4,092,424 A | 5/1978 | Brandi et al. |
| 4,188,418 A | 2/1980 | Livingston |
| 4,214,994 A | 7/1980 | Kitano et al. |
| 4,244,824 A | 1/1981 | Lange et al. |
| 4,259,183 A | 3/1981 | Cadotte |
| 4,277,344 A | 7/1981 | Cadotte |
| 4,303,548 A | 12/1981 | Shimazaki et al. |
| 4,387,024 A | 6/1983 | Kurihara et al. |
| 4,388,189 A | 6/1983 | Kawaguchi et al. |
| 4,392,960 A | 7/1983 | Kraus et al. |
| 4,492,721 A | 1/1985 | Joosten et al. |
| 4,559,139 A | 12/1985 | Uemura et al. |
| 4,567,009 A | 1/1986 | Badenhop et al. |
| 4,606,943 A | 8/1986 | Rak et al. |
| 4,693,985 A | 9/1987 | Degen et al. |
| 4,707,266 A | 11/1987 | Degen et al. |
| 4,713,438 A | 12/1987 | Harris et al. |
| 4,740,219 A | 4/1988 | Kulprathipanja et al. |
| 4,754,016 A | 6/1988 | Ai et al. |
| 4,762,619 A | 8/1988 | Gaddis et al. |
| 4,765,897 A | 8/1988 | Cadotte et al. |
| 4,765,915 A | 8/1988 | Diehl |
| 4,769,148 A | 9/1988 | Fibiger et al. |
| 4,778,596 A | 10/1988 | Linder et al. |
| 4,795,559 A | 1/1989 | Shinjou et al. |
| 4,814,082 A | 3/1989 | Wrasidlo |
| 4,830,885 A | 5/1989 | Tran et al. |
| 4,833,014 A | 5/1989 | Linder et al. |
| 4,840,977 A | 6/1989 | Crivello et al. |
| 4,842,736 A | 6/1989 | Bray et al. |
| 4,859,384 A | 8/1989 | Fibiger et al. |
| 4,872,984 A | 10/1989 | Tomaschke |
| 4,902,424 A | 2/1990 | Wrasidlo |
| 4,911,844 A | 3/1990 | Linder et al. |
| 4,931,362 A | 6/1990 | Zaifkovits et al. |
| 4,948,506 A | 8/1990 | Lonsdale et al. |
| 4,948,507 A | 8/1990 | Tomaschke |
| 4,950,404 A | 8/1990 | Chau |
| 4,971,697 A | 11/1990 | Douden et al. |
| 4,983,291 A | 1/1991 | Chua et al. |
| 5,002,590 A | 3/1991 | Friesen et al. |
| 5,017,680 A | 5/1991 | Sublett |
| 5,019,261 A | 5/1991 | Stengaard |
| 5,024,594 A | 6/1991 | Athayde et al. |
| 5,028,337 A | 7/1991 | Linder et al. |
| 5,032,268 A | 7/1991 | Hahn |
| 5,069,945 A | 12/1991 | Wrasidlo |
| 5,084,179 A | 1/1992 | Knight |
| 5,089,460 A | 2/1992 | Chien |
| 5,091,086 A | 2/1992 | Stengaard |
| 5,096,584 A | 3/1992 | Reddy et al. |
| 5,098,575 A | 3/1992 | Yaeli |
| 5,104,632 A | 4/1992 | Douden et al. |
| 5,108,607 A | 4/1992 | Kraus et al. |
| 5,114,582 A | 5/1992 | Sandstrom et al. |
| 5,130,025 A | 7/1992 | Lefebvre et al. |
| 5,147,541 A | 9/1992 | McDermott, Jr. et al. |
| 5,154,829 A | 10/1992 | Degen et al. |
| 5,160,617 A | 11/1992 | Huis In't Veld et al. |
| 5,160,673 A | 11/1992 | Wollbeck et al. |
| 5,173,189 A | 12/1992 | Hoshi et al. |
| 5,183,566 A | 2/1993 | Darnell et al. |
| 5,190,654 A | 3/1993 | Bauer |
| 5,234,598 A | 8/1993 | Tran et al. |
| 5,254,261 A | 10/1993 | Tomaschke et al. |
| 5,258,203 A | 11/1993 | Arthur |
| 5,262,054 A | 11/1993 | Wheeler |
| 5,269,926 A | 12/1993 | Webster et al. |
| 5,281,430 A | 1/1994 | Herron et al. |
| 5,342,431 A | 8/1994 | Anderson et al. |
| 5,376,442 A | 12/1994 | Davidson et al. |
| 5,435,957 A | 7/1995 | Degen et al. |
| 5,462,667 A | 10/1995 | Wollinsky et al. |
| 5,484,528 A | 1/1996 | Yagi et al. |
| 5,538,642 A | 7/1996 | Solie |
| 5,543,046 A | 8/1996 | Van Rijn |
| 5,576,057 A | 11/1996 | Hirose et al. |
| 5,614,099 A | 3/1997 | Hirose et al. |
| 5,650,479 A | 7/1997 | Glugla et al. |
| 5,658,460 A | 8/1997 | Cadotte et al. |
| 5,681,467 A | 10/1997 | Solie et al. |
| 5,681,473 A | 10/1997 | Miller et al. |
| 5,693,227 A | 12/1997 | Costa |
| 5,733,602 A | 3/1998 | Hirose et al. |
| 5,755,964 A | 5/1998 | Mickols |
| 5,783,079 A | 7/1998 | Kumano et al. |
| 5,800,706 A | 9/1998 | Fischer |
| 5,843,351 A | 12/1998 | Hirose et al. |
| 5,876,602 A | 3/1999 | Jons et al. |
| 5,914,039 A | 6/1999 | Mahendran et al. |
| 5,919,026 A | 7/1999 | Appleton |
| 5,938,934 A | 8/1999 | Balogh et al. |
| 5,989,426 A | 11/1999 | Hirose et al. |
| 6,015,495 A | 1/2000 | Koo et al. |
| 6,024,872 A | 2/2000 | Mahendran et al. |
| 6,024,873 A | 2/2000 | Hirose et al. |
| 6,117,341 A | 9/2000 | Bray et al. |
| 6,156,680 A | 12/2000 | Goettmann |
| 6,156,867 A | 12/2000 | Aoyama et al. |

(56) References Cited

U.S. PATENT DOCUMENTS

| | | | |
|---|---|---|---|
| 6,162,358 A | 12/2000 | Li et al. | |
| 6,171,497 B1 | 1/2001 | Hirose et al. | |
| 6,177,011 B1 | 1/2001 | Hachisuka et al. | |
| 6,185,940 B1 | 2/2001 | Prueitt | |
| 6,187,192 B1 | 2/2001 | Johnston et al. | |
| 6,241,893 B1 | 6/2001 | Levy | |
| 6,245,234 B1 | 6/2001 | Koo et al. | |
| 6,254,261 B1 * | 7/2001 | Bingle | E05B 83/26 362/100 |
| 6,277,282 B1 | 8/2001 | Kihara et al. | |
| 6,284,137 B1 | 9/2001 | Hajikano et al. | |
| 6,309,546 B1 | 10/2001 | Hermann et al. | |
| 6,337,018 B1 | 1/2002 | Mickols | |
| 6,368,507 B1 | 4/2002 | Koo et al. | |
| 6,391,205 B1 | 5/2002 | McGinnis | |
| 6,406,626 B1 | 6/2002 | Murakami et al. | |
| 6,413,425 B1 | 7/2002 | Haschisuka et al. | |
| 6,425,936 B1 | 7/2002 | Sammons et al. | |
| 6,472,016 B1 | 10/2002 | Soria et al. | |
| 6,540,915 B2 | 4/2003 | Patil | |
| 6,551,536 B1 | 4/2003 | Kwak et al. | |
| 6,562,266 B2 | 5/2003 | Mickols | |
| 6,582,495 B2 | 6/2003 | Chau et al. | |
| 6,585,802 B2 | 7/2003 | Koros et al. | |
| 6,605,140 B2 | 8/2003 | Guiver et al. | |
| 6,652,751 B1 | 11/2003 | Kutowy et al. | |
| 6,723,241 B2 | 4/2004 | Mickols | |
| 6,753,396 B2 | 6/2004 | Ulbricht et al. | |
| 6,755,900 B2 | 6/2004 | Koros et al. | |
| 6,821,430 B2 | 11/2004 | Andou et al. | |
| 6,837,996 B2 | 1/2005 | Kurth et al. | |
| 6,841,075 B2 | 1/2005 | Penth et al. | |
| 6,841,601 B2 | 1/2005 | Serpico et al. | |
| 6,878,278 B2 | 4/2005 | Mickols | |
| 6,881,336 B2 | 4/2005 | Johnson | |
| 6,890,436 B2 | 5/2005 | Komatsu et al. | |
| 7,018,538 B2 | 3/2006 | Leiser et al. | |
| 7,048,855 B2 | 5/2006 | de la Cruz | |
| 7,109,140 B2 | 9/2006 | Marand et al. | |
| 7,138,058 B2 | 11/2006 | Kurth et al. | |
| 7,182,894 B2 | 2/2007 | Kumar et al. | |
| 7,211,320 B1 | 5/2007 | Cooper et al. | |
| 7,311,982 B2 | 12/2007 | Christou et al. | |
| 7,459,121 B2 | 12/2008 | Liang et al. | |
| 7,490,725 B2 | 2/2009 | Pinnau et al. | |
| 7,604,746 B2 | 10/2009 | Childs et al. | |
| 7,871,522 B2 | 1/2011 | Stover et al. | |
| 7,955,656 B2 | 6/2011 | Murayama et al. | |
| 8,002,989 B2 | 8/2011 | McGinnis | |
| 8,011,517 B2 | 9/2011 | Allen et al. | |
| 8,017,050 B2 | 9/2011 | Freeman et al. | |
| 8,147,735 B2 | 4/2012 | Buschmann | |
| 8,177,978 B2 | 5/2012 | Kurth et al. | |
| 8,443,986 B2 | 5/2013 | Tanaka et al. | |
| 8,507,612 B2 | 8/2013 | Zhu | |
| 8,551,388 B2 | 10/2013 | Chalker et al. | |
| 8,567,612 B2 | 10/2013 | Kurth et al. | |
| 8,603,340 B2 | 12/2013 | Kurth et al. | |
| 8,801,635 B2 | 8/2014 | Hovorka | |
| 8,801,935 B2 | 8/2014 | Koehler et al. | |
| 9,022,227 B2 | 5/2015 | Na et al. | |
| 2002/0074282 A1 | 6/2002 | Herrmann et al. | |
| 2002/0187401 A1 | 12/2002 | Lee et al. | |
| 2003/0116498 A1 | 6/2003 | Mickols | |
| 2003/0116503 A1 | 6/2003 | Wang et al. | |
| 2003/0121844 A1 | 7/2003 | Koo et al. | |
| 2003/0132174 A1 | 7/2003 | Isomura et al. | |
| 2004/0178135 A1 | 9/2004 | Beplate | |
| 2004/0234751 A1 | 11/2004 | Sakurai et al. | |
| 2005/0077243 A1 | 4/2005 | Pinnau et al. | |
| 2005/0139066 A1 | 6/2005 | Miller et al. | |
| 2005/0145568 A1 | 7/2005 | McGinnis | |
| 2005/0173341 A1 | 8/2005 | Salinaro | |
| 2005/0230305 A1 | 10/2005 | Kulkarni et al. | |
| 2006/0062902 A1 | 3/2006 | Sager et al. | |
| 2006/0063911 A1 | 3/2006 | Cayton et al. | |
| 2006/0175256 A1 | 8/2006 | Masten et al. | |
| 2006/0201884 A1 | 9/2006 | Kulprathipanja et al. | |
| 2006/0204812 A1 | 9/2006 | Moriyama et al. | |
| 2006/0249447 A1 | 11/2006 | Yeager | |
| 2007/0272628 A1 | 11/2007 | Mickols et al. | |
| 2008/0149561 A1 | 6/2008 | Chu et al. | |
| 2008/0237126 A1 | 10/2008 | Hoek et al. | |
| 2008/0251447 A1 | 10/2008 | Koumoto et al. | |
| 2008/0295951 A1 | 12/2008 | Hiro et al. | |
| 2009/0159527 A1 | 6/2009 | Mickols et al. | |
| 2009/0272692 A1 | 11/2009 | Kurth et al. | |
| 2010/0006495 A1 | 1/2010 | Buschmann | |
| 2010/0025330 A1 | 2/2010 | Ratto et al. | |
| 2010/0044902 A1 | 2/2010 | Ohara et al. | |
| 2010/0051538 A1 | 3/2010 | Freeman et al. | |
| 2010/0062156 A1 | 3/2010 | Kurth et al. | |
| 2010/0193428 A1 | 8/2010 | Hane et al. | |
| 2011/0031180 A1 | 2/2011 | Tada et al. | |
| 2011/0155660 A1 | 6/2011 | Mickols et al. | |
| 2011/0174728 A1 | 7/2011 | Eisen et al. | |
| 2012/0048798 A1 | 3/2012 | Cheng et al. | |
| 2012/0048805 A1 | 3/2012 | McCutcheon et al. | |
| 2012/0111791 A1 | 5/2012 | Freeman et al. | |
| 2012/0285890 A1 | 11/2012 | Koehler et al. | |
| 2013/0146530 A1 * | 6/2013 | Wang | B01D 67/0079 210/500.38 |
| 2013/0284664 A1 | 10/2013 | Takagi et al. | |
| 2013/0287946 A1 | 10/2013 | Jons et al. | |
| 2014/0014575 A1 | 1/2014 | Kwon et al. | |
| 2014/0050846 A1 | 2/2014 | Kurth et al. | |
| 2015/0107455 A1 | 4/2015 | Mayer et al. | |
| 2015/0273404 A1 | 10/2015 | Hoek et al. | |

FOREIGN PATENT DOCUMENTS

| | | |
|---|---|---|
| CN | 101695636 | 4/2010 |
| CN | 101816900 | 9/2010 |
| EP | 0348041 | 12/1989 |
| JP | 63-012310 | 1/1988 |
| JP | 04-126529 | 4/1992 |
| JP | 05-245349 | 9/1993 |
| JP | H08-182921 | 7/1996 |
| JP | 2000-225327 | 8/2000 |
| JP | 2006-187731 | 7/2006 |
| KR | 1020010100304 | 11/2001 |
| KR | 1020050077141 | 8/2005 |
| WO | 00/76641 | 12/2000 |
| WO | 00/78437 | 12/2000 |
| WO | 01/78882 | 10/2001 |
| WO | 02/04082 | 1/2002 |
| WO | 02/015299 | 2/2002 |
| WO | 02/051528 | 7/2002 |
| WO | 03/047734 | 6/2003 |
| WO | 03/097218 | 11/2003 |
| WO | 03/097221 | 11/2003 |
| WO | 2004/022491 | 3/2004 |
| WO | 2005/014266 | 2/2005 |
| WO | 2005/023414 | 3/2005 |
| WO | 2005/057700 | 6/2005 |
| WO | 2006/030411 | 3/2006 |
| WO | 2006/098872 | 9/2006 |
| WO | 2006/135384 | 12/2006 |
| WO | 2007/001405 | 1/2007 |
| WO | 2007/024461 | 3/2007 |
| WO | 2007/035019 | 3/2007 |
| WO | 2007/050408 | 5/2007 |
| WO | 2007/065866 | 6/2007 |
| WO | 2007/084169 | 7/2007 |
| WO | 2007/095363 | 8/2007 |
| WO | 2007/133362 | 11/2007 |
| WO | 2007/133609 | 11/2007 |
| WO | 2008/057842 | 5/2008 |
| WO | 2008/066939 | 6/2008 |
| WO | 2008/091658 | 7/2008 |
| WO | 2008/118228 | 10/2008 |
| WO | 2009/129354 | 10/2009 |

(56) References Cited

FOREIGN PATENT DOCUMENTS

| WO | 2010/123518 | 10/2010 |
|---|---|---|
| WO | 2011/008549 | 1/2011 |
| WO | 2011069050 A1 | 6/2011 |

OTHER PUBLICATIONS

Arthur, "Structure-Property Relationship in a Thin Film Composite Reverse Osmosis Membrane," Journal of Membrane Science, 1989, 46:243-260.

Bae et al., "Preparation of $TiO_2$ self-assembled polymeric nanocomposite membranes and examination of their fouling mitigation effects in a membrane bioreactor system," J. Membrane Science, 266 (2005):1-5.

Bermudez et al, "Infinite Dilution Activity Coefficients in Tributyl Phosphate and Triacetin," J. Chem. Eng. Data, 2000, 45:1105-1107.

Bhattacharyya et al., "An Overview of Selected Membrane Techniques for Environmental Applications," J. Chin. Inst. Chan. Eners., 2002, 33(1):62-66.

Boom et al., "Microstructures in phase inversion membranes. Part 2. The role of a polymeric additive," J. Membrane Science, 73 (1992):277-292.

Cadotte et al., "Advanced Poly (Piperazineamide) Reverse Osmosis Membranes" NT1S: Final Report, 1979, pp. 1-48.

Cadotte et al., "Continued Evaluation of in Situ-Formed Condensation Polymers for Reverse Osmosis Membranes" NTIS: Final Report, 1976, pp. 1-80 (92 pages total).

Cadotte et al., "Research on 'in Situ'-Formed Condensation Polymer for Reverse Osmosis Membranes" NTIS: Final Report, 1978, pp. 1-44 (56 pages total).

Cadotte, J.E., "Evolution of Composite Reverse Osmosis Membranes," Materials Science of Synthetic Membranes, 1985, pp. 273-294.

Camblor et al. "Characterization of nanocrystalline zeolite Beta," Microporous and Mesoporous Materials, 1998, 25(1-3):59-74.

Chui, et al. "A Chemically Functionalizable Nanoporous Material $[Cu_3(TMA)_2(H_2O)_3b$," Science, 1999, 283:1148-1150.

Freger et al., "TFC polyamide membranes modified by grafting of hydrophilic polymers: an FT-IR/AFM/TEM study," J. Membrane Science, 209 (2002):283-292.

Goosen et al., "Fouling of Reverse Osmosis and Ultrafiltration Membranes: A Critical Review," Separation Science and Technology, 39(10):2261-2298 (2004).

Hoek et al., "Influence of Crossflow Membrane Filter Geometry and Shear Rate on Colloidal Fouling in Reverse Osmosis and Nanofiltration Separations," Environ. Engineering Science, 19(6):357-372 (2002).

Hoek et al., "Cake-Enhanced Concentration Polarization: A New Fouling Mechanism for Salt-Rejecting Membranes," Environ. Sci. Technol., 37 (2003):5581-5588.

Hoek et al., "Effect of Membrane Surface Roughness on Colloid—Membrane DLVO Interactions," Langmuir 19 (2003):4836-4847.

Holmberg et al. "Controlling size and yield of zeolite Y nanocrystals using tetramethylammonium bromide," Microphone and Mesoporous Materials, 2003, 59(1):13-28.

Jeong et al., "Interfacial polymerization of thin film nanocomposites: A new concept for reverse osmosis membranes," Journal of Membrane Science, 2007, 294:1-7.

Kang et al., "A Novel Method of Surface Modification on Thin-Film Composite Reverse Osmosis Membrane by Grafting (Ethylene Glycol)" Polymer, 2007, 48(5):1165-1170.

Kang et al., "Direct observation of biofouling in cross-flow microfiltration: mechanisms of deposition and release," J. Membrane Science, 244(1-2):151-165 (2004).

Lau et al., "A recent progress in thin film composite membrane: A review, " Desalination, 287 (2012):190-199.

Lee et al., "Effect of Operating Conditions on $CaSO_4$ Scale Formation Mechanism in Nanofiltration for Water Softening," Wat. Res. 34(15):3854-3866 (2000).

Lemanski et al., "Effect of shell-side flows on the performance of hollow-fiber gas separation modules," J. Membrane Science, 195 (2001):215-228.

Li et al., "Organic Fouling and Chemical Cleaning of Nanofiltration Membranes: Measurements and Mechanisms," Environ. Sci. Technol., 38 (2004):4683-4693.

Lohokare et al., "Effect of Support Material on Ultrafiltration Membrane Performance," J. Applied Polymer Science, 99 (2006):3389-3395.

McDonnell et al., "Hydrophilic and Antimicrobial Zeolite Coatings for Gravity-Independent Water Separation," Adv. Funct. Mater., 15(2):336-340 (2005).

Rong et al., "Structure-property relationships of irradiation grafted nano-inorganic particle filled polypropylene composites," Polymer 42 (2001):167-183.

Rowsell et al., "Metal-organic frameworks: a new class of porous materials," Microporous and Mesoporous Materials, 73 (2004):3-14.

Van et al., "Surface reaction kinetics of metal β-diketonate precursors with O radicals in radical-enhanced atomic layer deposition of metal oxides," Applied Surface Science, 246 (2005):250-261.

Vrijenhoek et al., "Influence of membrane surface properties on initial rate of colloidal fouling of reverse osmosis and nanofiltration membranes," J. Membrane Science, 188 (2001):115-128.

Walker et al., "A Novel Asymmetric Clamping Cell for Measuring Streaming Potential of Flat Surfaces," Langmuir, 18(2002):2193-2198.

Wang et al., "Formation of semi-permeable polyamide skin layers on the surface of supported liquid membranes," Journal of Membrane Science, 1998, 147:109-116.

Wang et al., "Direct Observation of Microbial Adhesion of Membranes," Environ. Sci. Technol., 39 (2005):6461-6469.

Wei et al., "A novel method of surface modification on thin-film-composite reverse osmosis membrane by grafting hydantoin derivative," J. Membrane Science, 346 (2010):152-162.

Wei et al., "Surface modification of commercial aromatic polyamide reverse osmosis membranes by graft polymerization of 3-allyl-5,5-dimethylhydantoin," J. Membrane Science, 351 (2010):222-233.

Zhu et al., "Colloidal Fouling of Reverse Osmosis Membranes: Measurements and Fouling Mechanisms," Environ. Sci. Technol., 31 (1997):3654-3662.

* cited by examiner

PROCESS FOR IMPROVED WATER FLUX THROUGH A TFC MEMBRANE

FIELD OF THE INVENTION

The present invention relates to thin film composite (TFC) membranes, including membranes used for nanofiltration, reverse or forward osmosis, e.g., to purify water, including tap water, brackish water (BW) and sea water (SW), and more particularly to additives and processes for enhancing water flux in TFC membranes.

BACKGROUND OF THE INVENTION

TFC membranes are membranes that have layers of dissimilar materials joined together to form a single membrane. This layered construction permits the use of material combinations that optimize performance and durability of the membrane. TFC membranes are used for nanofiltration, and in reverse osmosis and forward osmosis membranes for treating tap water, brackish water and sea water. Such membranes typically are made by interfacial polymerization of a monomer in a nonpolar (e.g., organic) phase together with a monomer in a polar (e.g., aqueous) phase forming a discrimination layer on a porous support layer. TFC membranes are used where flux and substantial rejection characteristics are required, e.g., in the purification of water. Various materials and chemical additives have been added to TFC membranes during polymerization to increase flux without reducing rejection characteristics. TFC membranes are also subject to fouling resulting in reduced flux as contaminants, e.g., material from the brackish or sea water to be purified, build up on the surface of the TFC membrane.

When designed for reverse osmosis (RO), the TFC membrane can be made of any material, and can take any form, as long as it is capable of performing reverse osmosis, that it, it is capable, under a suitable applied pressure, of preferentially permeating water and rejecting dissolved salts. Typical reverse osmosis TFC membranes can include a felt backing layer, a support layer, and a discrimination layer. The discrimination layer can be a polyamide film that can be used to filter the liquid, usually removing salt from water. The support layer is located between the discrimination layer and the felt backing layer and generally is a porous polymer material such as polysulfone to allow the flow of filtered fluid. The felt backing layer is typically porous so as to allow fluid that has been filtered by the discrimination layer to flow through the membrane sheet.

The interfacially polymerized discrimination layer of the TFC membrane can be made by any of the known techniques. Exemplary embodiments of the discrimination layers, their chemistry and method of manufacturing them are disclosed in U.S. Pat. Nos. 4,039,440; 4,277,344; 4,902,424; 5,108,607; 5,543,046; 6,337,018; 7,109,140; and 8,177,978, each of which is herein incorporated by reference. Preferably the discrimination layer is a crosslinked polyamide. After interfacial polymerization and formation of the discrimination layer, the TFC membrane typically is dried, then washed to remove excess reactants prior to final drying or application of a frontside coating, such as a protective layer or an anti-fouling coating layer. The final drying and/or coating of the membrane can decrease the water flux through the membrane. This negative impact on water flux can be caused by the collapse of pores during the drying process.

In addition to the discrimination layer and the support layer, any number of other layers can be present on the TFC membrane, such intermediate layers between the support and discrimination layers, and coating layers (including those resulting from chemically modifying the surface of the discrimination layer) added as a protective layer, or to change the charge characteristics of the surface of the discrimination layer, or to improve the rejection properties, or to reduce fouling. Theses coating layers coat the reverse osmosis membrane on the side that will be exposed to the feed solution when the membrane is in use.

Various protective, anti-fouling and performance enhancing coating layers are known (see U.S. Pat. Nos. 6,177,011; 6,413,425; 7,490,725; 8,011,517; 8,017,050; 8,443,986; and 9,022,227, and U.S. Pat. Appl. Pub. Nos. 2010/0051538 and 2012/0111791). Application of these coatings layers can have a negative impact on water flux through the membrane, which can be caused by the drying process generally using to cross-link or dry the coating.

What is needed is a process that can minimize or eliminate the negative impact on the water flux through the membrane often observed upon drying and/or the addition of a coating layer to the TFC membrane.

SUMMARY OF THE INVENTION

Accordingly, the present invention is directed to method for producing a TFC membrane with improved water flux through the membrane. The TFC membrane can include at least one coating layer on the surface of the discrimination layer, such as a protective, anti-fouling or performance enhancing coating layer or a combination thereof.

After formation of the discrimination layer of a TFC membrane and drying and rinsing the TFC membrane, and prior to final drying or application of a coating layer, it has been determined that treating the backside of a TFC membrane with a backside treatment solution containing a pore structure protection agent can preserve the TFC membrane performance properties when the membrane is dried and rolled prior to element assembly. A tertiary amine salt of camphorsulfonic acid has been developed as a post-rinse pore structure protection agent. An exemplary pore structure protection agent is triethylammonium camphorsulfonate (TEACSA).

When the pore structure protection agent is included in a backside treatment solution and applied to the backside of a TFC membrane post-rinsing after interfacial polymerization and prior to drying or application of a frontside coating, the TFC membrane exhibits better water flux performance and maintains salt rejection after the drying process has been completed, compared to membranes prepared without application of a pore structure protection agent. With sea water TFC membranes, moderate water flux improvements can be realized using a pore structure protection agent in a backside treatment solution prior to drying or coating the membrane. With brackish water TFC membranes, large membrane flux improvements can be realized using a pore structure protection agent in a backside treatment solution. The lower pressures driving permeation under brackish conditions are believed to be the cause of the significant flux improvement for brackish membrane compared to sea water membranes. Under brackish conditions, restrictions to flow caused by pore collapse have a more significant effect because there is less driving force to overcome the restrictions caused by pore collapse.

It also has been determined that using a tertiary amine salt of camphorsulfonic acid as a pore protection agent has the added benefit of eliminating the possibility of osmotic blister formation that sometimes can occur when a drying agent such as sodium citrate is used. These osmotic blisters would manifest when the surface of the membrane was wetted and water sought to dilute the osmotic pressure difference caused by the sodium citrate salt concentration on the backside of the thin film. Since sodium citrate formed crystals when dried, the crystal could temporarily block the support pore layers, allowing osmotic pressure to build behind the thin film membrane. Any areas of the thin film membrane with weak adhesion to the support layer would delaminate, creating a blistered membrane that was susceptible to breakage by abrasion or any defects introduced in the membrane during its formation or handling. Using a tertiary amine salt of camphorsulfonic acid as the pore structure protection agent avoids any osmotic blister formation.

Provided herein are processes for improving water flux of a TFC membrane. The processes include treating a TFC membrane having at least a felt layer on a backside, a support layer, and a discrimination layer on a front side by applying a backside treatment solution containing from about 0.1 wt % to about 33 wt % of a tertiary amine salt of camphorsulfonic acid as a pore structure protection agent to the backside of the TFC membrane to form a backside-treated TFC membrane, and drying the backside-treated TFC membrane to yield a treated TFC membrane. The treated TFC membrane exhibits a water flux that is greater than the water flux of a TFC membrane prepared without treating the backside with the backside treatment solution. The discrimination layer can include a polyamide. The drying step can include heating the treated TFC membrane until the surface the treated TFC membrane reaches a temperature of at least 75° C.

The tertiary amine of the tertiary amine salt of camphorsulfonic acid can be selected from among a trialkylamine having 1 to 6 carbon atoms in the alkyl moiety, a pyridine having 0 to 3 alkyl groups of 1 to 6 carbon atoms, an alkyl-alcohol-amine, an N-alkyl-pyrrolidine having 1 to 6 carbon atoms in the alkyl moiety, an alkylbenzylamine, and a heteroaromatic tertiary amines or a combination thereof. The tertiary amine of the tertiary amine salt of camphorsulfonic acid can be selected from among pyridine, 4-dimethylamino-pyridine, quinoline, isoquinoline, phenanthridine, triethylamine, ethyldiisopropylamine, N,N-dimethyl-cyclohexylamine, N-methylpyrrolidine triethanolamine, methyl-diethanol-amine, ethyl-diethanolamine, dimethylethanolamine, butyldiethanolamine, octadecyl-diethanolamine, cyclohexyldiethanolamine, benzyldiethanolamine. benzyl-methylethanol amine, diethyl-ethanolamine, diethylcyclohexynolamine. methyloctadecyl-ethanolamine, methyloctadecenylethanolamine, dimethylbenzylamine, and a picoline. The backside treatment solution can include a solvent selected from among water, a $C_1$-$C_4$ alcohol, a $C_1$-$C_4$ ketone, a glycol, a polyalkylene glycol, a mono-alkyl ether of ethylene glycol and a di-alkyl ether of ethylene glycol, and a combination thereof.

The processes provided herein also can include as a step applying a coating to the frontside of the TFC membrane. The frontside coating can include from about 0.1 wt % to about 10 wt % of a polymer selected from among polyvinyl alcohol, polyvinylpyrrolidone, polyethylene, polypropylene, polyethersulfone, polyvinylidene fluoride, polytetrafluoroethylene, polyethylene terephthalate, polytrimethylene terephthalate, polybutylene terephthalate, polystyrene, polyacrylonitrile, polymethyl methacrylate, a polyvinyl acetate polyalcohol, a polyalkylene oxide, a polyimine, a polyacrylic acid, a polyacrylonitrile, a polyamine, a polyurethane, and a polyurea, and derivatives thereof and copolymers thereof. The coating can include from about 0.1 wt % to about 40 wt % of a humectant selected from among glycerol, polyglycerol, polyethylene glycol, an alkylene glycol, and a sugar alcohol, and any combination thereof.

Also provided are TFC membranes produced by the processes provided herein. The TFC membranes produced by the methods provided herein can be used for nanofiltration, or reverse osmosis, or forward osmosis. When used for reverse osmosis, the TFC membrane can exhibit a water flux of at least 18 gfd and a salt rejection of at least 99.6% when the membrane is exposed to deionized water containing 2,000 ppm NaCl at a temperature of 25° C. and a pressure of 225 psi; or the TFC membrane can exhibit a water flux of at least 15 gfd and a salt rejection of at least 99.8% when the membrane is exposed to sea water at a temperature of 25° C. and a pressure of 800 psi.

Also provided are methods of purifying tap water or sea water or brackish water containing 2,000 ppm or less NaCl, the methods including contacting tap water with the TFC membrane of claim 12 at a hydrostatic pressure of about 150 psi or less; or contacting the sea water with the TFC membrane of claim 12 at a hydrostatic pressure of about 800 psi or less; or contacting the brackish water with the TFC membrane of claim 12 at a hydrostatic pressure of about 225 psi or less.

Also provided are reverse osmosis modules that include the TFC membrane treated on the backside with a backside treatment solution containing from about 0.1 wt % to about 33 wt % of a tertiary amine salt of camphorsulfonic acid as a pore structure protection agent to the backside of the TFC membrane prior to drying and/or frontside coating of the TFC membrane. The membranes can be spirally wound around a central perforated tube. The membranes also can be formed as hollow fibers, and can be potted into hollow fiber modules.

Also provided are processes for reverse osmosis using the membranes that have been treated on the backside with a pore structure protection agent prior to drying or coating on the frontside. The processes include providing a membrane separation device having a feed side and a permeate side and containing a reverse osmosis TFC membrane as provided herein; passing a water stream containing a contaminant removable by reverse osmosis across the feed side under reverse osmosis conditions; removing from the feed side a contaminant-enriched water stream; and removing from the permeate side a treated water stream depleted in the contaminant. In some applications, the contaminate is a salt. The feed water flows across the feed side surfaces of the membranes. Treated water, depleted in the contaminant, is withdrawn as a permeate stream. The concentrate stream is withdrawn from the feed side as a retentate stream. The processes can include additional steps, including, but not limited to, pretreatment filtration and/or flocculation of colloids, and post-filtration disinfection, such as by treatment with UV radiation, electrolysis or ozone.

Additional features and advantages of the invention will be set forth in the description which follows, and in part will be apparent from the description, or can be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "alkyl" refers to a straight, branched, or cyclic chain containing at least one carbon atom and no double or triple bonds between carbon atoms.

As used herein, "flux" refers to liquid flow through a membrane.

As used herein, "rejection rate" refers to the percent reduction in concentration of the unwanted component from the fluid. Thus, for example, in the desalination process of sea water or brackish water, a rejection rate would be the percent reduction in salt concentration present in the permeate as compared to feed sea water or feed brackish water.

As used herein, "permeable" and "permeability" refer to the property of a material or membrane that causes it to allow liquids or gases meant to be filtered to pass through it. Thus, in exemplary embodiments wherein the fluid to be filtered is salt water or brackish water to remove salt, permeability refers to the property of a material or membrane that causes it to allow water to pass through while rejecting salt.

As used herein, a "combination" refers to any association between two items or among more than two items. The association can be spatial or refer to the use of the two or more items for a common purpose.

As used herein, the term "surfactant" refers to molecules that absorb at the air/water, oil/water and/or oil/air interfaces, substantially reducing their surface energy. Surfactants generally are classified depending on the charge of the surface active moiety, and can be categorized as cationic, anionic, nonionic and amphoteric surfactants.

As used herein, a "thin film composite membrane" refers to a membrane that has layers of dissimilar materials joined together to form a single membrane.

As used herein, the term "contacting" refers to bringing two or more materials into close enough proximity whereby they can interact.

As used herein, "gfd" refers to gallons/square foot/day.

As used herein, "CSA" refers to camphorsulfonic acid, which also is known as ±-camphor-10-sulfonic acid, and has CAS Registry Number 5872-08-2.

As used herein, "TEACSA" refers to the triethylamine salt of camphorsulfonic acid. TEACSA also is known as triethylammonium camphorsulfonate.

As used herein, "BW" refers to brackish water.

As used herein, "SW" refers to sea water.

B. Preparation of Thin Film Composite Membranes

The construction of permeable TFC membranes is not particularly limited. These membranes should, however, allow for the filtering of a given fluid. In exemplary embodiments, the permeable TFC membranes can be designed to filter salt water, such as brackish water or sea water, but also can be used for filtering other aqueous solutions. A schematic, exemplary and non-limiting representation of the structure of a permeable TFC membrane is provided in FIG. 1. The permeable TFC membrane 100 can include three main layers, a backside felt layer 140, a support layer 130 and a discrimination layer 120. In alternative embodiments, the permeable TFC membrane can include additional layers. The TFC membrane can be provided as a sheet or as a hollow tube.

1. Backside Felt Layer

Figure 1:
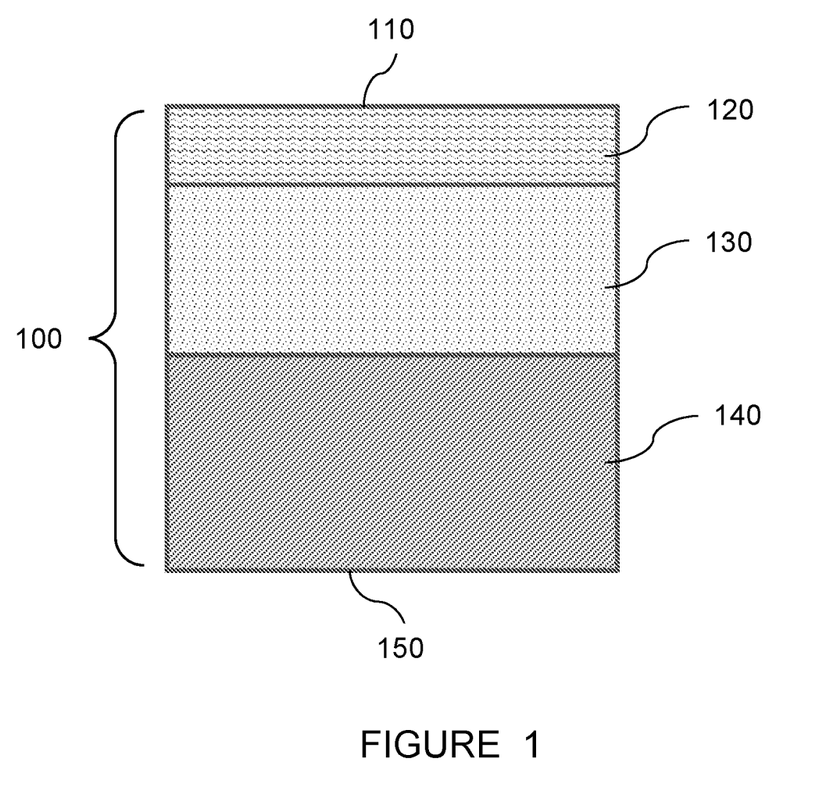
FIG. 1 is a schematic drawing of an exemplary embodiment of a TFC membrane having a discrimination layer on the frontside, a support layer and a felt layer on the backside.

The bottom or backside felt layer 140 can be or contain a woven or non-woven fabric material. The backside felt layer 140 can alternatively be a fibrous web mat including orientated fibers. In an exemplary embodiment, felt layer 140 is a layer of non-woven fibers orientated in the roll direction. The backside felt layer 140 can provide structural strength and integrity to the membrane sheet. The backside felt layer 140 is preferably permeable to water, flat, and without stray fibers that could penetrate support layer 130 or discrimination layer 120, which is shown oriented on frontside 110. The backside felt layer 140 is preferably thin to decrease cost and to maximize membrane area, strong against extension, and mechanically resistant to deformation at high pressure. In exemplary embodiments, the backside felt layer 140 can be formed of polyester. Alternative polymeric materials also can be used. Exemplary materials that can be used as or included in the backside felt layer 140 are disclosed in U.S. Pat. Nos. 4,214,994; 4,795,559; 5,435,957; 5,919,026; 6,156,680; and 7,048,855; and in U.S. Patent Application Publication Nos. 2008/0295951 and 2010/0193428, each of which is incorporated herein by reference.

2. Porous Support Layer

Over the backside felt layer 140 the TFC membrane sheet can include a porous support layer 130. Porous support layer 130 can be formed of a polymer material. In an exemplary embodiment, porous support layer 130 can include a polysulfone layer. Other materials can also be used to form the support layer. Support layer 130 is typically 25 to 250 microns thick, but can have a thickness less than about 25 microns or greater than about 250 microns. Support layer 130 can conventionally be made from any suitably porous membrane, such as polyethersulfone, poly(ether sulfone ketone), poly(ether ethyl ketone), poly(phthalazinone ether sulfone ketone), polyacrylonitrile, polypropylene, cellulose acetate, cellulose diacetate, or cellulose triacetate. These microporous materials can have the smallest pores located very near the upper surface. Porosity at the surface can be low, for instance from 5-15% of the total surface area. Support layer 130 can be prepared by adding N-methylpyrrolidone (NMP) solvent (Across Organics, USA) to a polysulfone polymer ($M_n$-26,000 from Aldrich, USA) ($M_n$ being the number average molecular weight) in transparent bead form in airtight glass bottles. Dimethylformamide (DMF) also can be used as the solvent. The solution can be cast or spread over the backside felt layer 130 followed by one or more rinsing steps using demineralized water. Exemplary processes known in the art to form support layer 130 are disclosed, for example, in U.S. Pat. Nos. 3,926,798 and 8,177,978; and in U.S. Patent Application Publication Nos. 2011/0174728 and 2014/0014575, each of which is incorporated herein by reference.

3. Discrimination Layer

Over porous support layer 130, a discrimination layer 120 can be formed, shown on the frontside 110 in FIG. 1. The discrimination layer 120 can be any material that is able to filter the fluid for which the membrane is to be used. In an exemplary embodiment, the discrimination layer 120 can be a polyamide layer. Also, in exemplary embodiments, the discrimination layer 120 can be designed to filter sea water or brackish water. In such embodiments, the discrimination layer can be designed to filter salt from the sea water or brackish water or tap water. The discrimination layer 120 also can be designed to filter an aqueous solution.

Although the chemistry of the discrimination layer 120 is not to be viewed as limited, an exemplary embodiment of the discrimination layer can include a polyamide layer formed by interfacial polymerization of a polar solution and a non-polar solution. An exemplary polar solution is an aqueous solution of a polyamine such as m-phenylenediamine (MPD). An exemplary non-polar solution is an organic solution of a polyfunctional acid halide such as trimesoyl chloride (TMC). Various additives to either or both solutions can also be present. Methods and chemistries that can be used to form the discrimination layer are generally known in the art. Exemplary embodiments of the discrimination layers, their chemistry and method of manufacturing them are disclosed in U.S. Pat. Nos. 4,277,344; 4,902,424; 5,108,607; 5,543,046; 6,337,018; 7,109,140; and 8,177,978, each of which is herein incorporated by reference.

Illustrated in FIG. 1 is a diagram of a TFC membrane 100 containing a backside felt layer 140, a support layer 130, and a discrimination layer 120. For ease of reference, the frontside of the TFC membrane is referred to as item 110 and the backside of the TFC membrane is referred to as item 150. The support layer 130 can include polysulfone. The felt layer 140 can contain polyester. As discussed earlier, the support layer 130 and the backside felt layer 140 are porous so as to allow the permeate from the discrimination layer 120 to pass through the TFC membrane. It is noted that the diagram is not to scale, as the discrimination layer 120 generally is much thinner than support layer 130 and backside felt layer 140. The thickness is not necessarily exactly the same across the TFC membrane. The support layer, as well as the other layers of the TFC membrane sheet, can have minor thickness variations. After formation, the TFC membrane typically is subjected to finishing steps, which can include a series of rinsing and air- and/or oven-drying steps, optionally followed by a coating step. The rinsing step(s) can remove any excess reactants, but also can result in removal of any drying agents incorporated into the membrane during formation.

C. Frontside Coating of the TFC Membrane

Many TFC membranes are subjected to a coating process as a finishing step. Any one or a combination of coating materials can be applied to the frontside of the TFC membrane as a finishing step. For example, a protective layer can be applied to the surface of the discrimination layer as a finishing step. Examples of typical coatings are described, e.g., in U.S. Pat. Nos. 6,177,011; 6,413,425; 7,490,725; 8,011,517; 8,017,050; 8,443,986; and 9,022,227, and U.S. Pat. Appl. Pub. Nos. 2010/0051538 and 2012/0111791). The coating layer typically coats a reverse osmosis TFC membrane on the side that will be exposed to the feed solution when the membrane is in use (usually the frontside containing the discrimination layer).

The coating generally is not relied upon to impart reverse osmosis separation properties, and in general, the rejection properties of the coated membranes are similar to those of an uncoated membrane of the same structure and composition. For example, a typical coating usually does not change the rejection of the membrane by more than 10% in either direction. For certain solutes, the coating may result in a slightly higher rejection, but the improvement is typically minor, such as no more than about 5%. In some cases, the rejection may be lower after coating, but again, the change is typically only a few percent, such as 5% or less. Frequently, the rejection stays within ±1% of its original value after coating.

The coating can increase the thickness of the membrane, and a coated membrane with a thick coating layer can exhibit a lower water flux than the water flux of an uncoated membrane of the same structure and composition. Typically, a coating can be applied so that the resulting dried coating or film on the membrane is of a thickness that does not significantly lower the water flux of the membrane. In some applications, the coating can be applied so that the reduction in water flux is about 10% or less, or 5% or less.

During prolonged operation, coated membranes, particularly those coated with an anti-fouling coating, typically are much less susceptible to fouling than their uncoated equivalents. For example, when coated membranes are exposed to common contaminants such as oils, surfactants, other organic compounds and heavy metals, the coated membranes generally exhibit a much slower rate of flux decline than uncoated membranes. It is believed that this is because the coating minimizes or prevents internal fouling, caused by material trapped inside pores and crevices, and any fouling of the coated membranes tends to be confined to material adhering on the surface. As a result, coated membranes can recover their flux much better after cleaning than an uncoated membrane of the same composition and construction. Thus, even if coating results in a loss in water flux, the benefits gained due to anti-fouling properties can be used to justify the loss in water flux.

D. Backside Treatment with a Pore Structure Protection Agent

The processes provided herein allow for improved water flux of membranes after drying and/or application of a finishing coating, such as a protective coating or anti-fouling coating. During polymerization of the discrimination layer, drying agents, such as TEACSA or sodium citrate, can be included in the aqueous phase. After formation and drying of the discrimination layer, the TFC membrane often is washed or rinsed to remove any excess reagents from the membrane. Any drying agents included in the aqueous phase or organic phase during interfacial polymerization typically are washed out of the membrane in these washing or rinsing steps. After washing or rinsing, the TFC membrane can be dried and stored for further use, such as to be incorporated into a module. The water flux after drying typically is lower than a membrane of the same composition and construction tested prior to drying.

After washing or rinsing, the TFC membrane also can be further processed to include a frontside coating, such as a finishing protective coating. During the frontside coating process, heat treatment often is used to remove residual solvents or to promote cross-linking or other reactions of the applied coating materials. High temperatures can promote shrinkage of the pores of the discrimination layer, which can reduce the porosity of the film, thereby having an adverse effect on water flux (decreasing the water flux through the membrane even more than expected due to any increase in thickness of the membrane due to addition of the coating layer).

It surprisingly has been found that, prior to final drying, or prior to, or simultaneously with, application of a coating layer on the frontside 110, treating the backside 150 of the TFC membrane with a backside treatment solution containing a combination of the strong acid camphorsulfonic acid (CSA) and a tertiary amine as a pore structure protection agent results in improved flux through the membrane after drying the membrane or after the applied coating has been dried.

Any tertiary amine can be used with the CSA to form the tertiary amine salt of CSA that can be used as a pore structure protection agent. The tertiary amine used to form the tertiary amine salt of CSA can include a trialkylamine having 1 to 6 carbon atoms in the alkyl moiety, a pyridine having 0 to 3 alkyl groups of 1 to 6 carbon atoms, an alkyl-alcohol-amine, an N-alkyl-pyrrolidine having 1 to 6 carbon atoms in the alkyl moiety, an alkylbenzylamine, and a heteroaromatic tertiary amine. Exemplary tertiary amines that can be used to form the tertiary amine salt of CSA include pyridine, 4-dimethylaminopyridine, quinoline, isoquinoline, phenanthridine, triethylamine (TEA), ethyldiisopropylamine, N,N-dimethyl-cyclohexylamine, N-methylpyrrolidine triethanolamine, methyldiethanolamine, ethyldiethanolamine, dimethylethanolamine, butyldiethanolamine, octadecyl-diethanolamine, cyclohexyldiethanolamine, benzyldiethanolamine. benzylmethylethanolamine, diethyl-ethanolamine, diethyl cyclohexynolamine. methyloctadecyl-ethanolamine, methyloctadecenylethanolamine, dimethylbenzylamine, and a picoline. These tertiary amines are well known and are commercially available (e.g., from Sigma-Aldrich Corp., St. Louis, Mo., USA). A preferred combination is CSA and TEA. Generation of the amine salt of CSA can be accomplished by reacting equal molar amounts of CSA and the tertiary amine. For example, the triethylamine salt of camphorsulfonic acid (TEACSA) can be prepared by reacting 1 mole of CSA with 1 mole of TEA, or mixing CSA with TEA in a weight ratio of about 2.32:1.1 CSA:TEA. Excess tertiary amine also can be used in the generation of the amine salt of CSA.

The backside treatment solution can include an amount of tertiary amine salt of camphorsulfonic acid from about 0.1 wt % to about 33 wt %. The amount of the tertiary amine salt of camphorsulfonic acid present can be 0.1 wt %, or 0.2 wt %, or 0.3 wt %, or 0.4 wt %, or 0.5 wt %, or 0.6 wt %, or 0.7 wt %, or 0.8 wt %, or 0.9 wt %, or 1 wt %, or 2 wt %, or 3 wt %, or 4 wt %, or 5 wt %, or 6 wt %, or 7 wt %, or 8 wt %, or 9 wt %, or 10 wt %, or 11 wt %, or 12 wt %, or 13 wt %, or 14 wt %, or 15 wt %, or 16 wt %, or 17 wt %, or 17 wt %, or 18 wt %, or 19 wt %, or 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or an amount in a range of at or about a to at or about b, where a is any one of the preceding wt % values of tertiary amine salt of camphorsulfonic acid, and b is any one of the preceding wt % values of tertiary amine salt of camphorsulfonic acid that is >a, such as from about 0.3 wt % to about 30 wt %, or from about 0.5 wt % to about 25 wt %, or from about 1 wt % to about 20 wt %, etc.

When the tertiary amine salt of camphorsulfonic acid is present in an amount less than about 0.1 wt % in the backside treatment solution, no increase in water flux is observed. The performance of a membrane treated on the backside with a backside treatment solution containing less than 0.1 wt % tertiary amine salt of camphorsulfonic acid was almost the same as backside treatment with deionized water. When the tertiary amine salt of camphorsulfonic acid is present in an amount greater than about 33 wt % in the backside treatment solution, no further improvement in water flux, compared to the tertiary amine salt of camphorsulfonic acid present in an amount of about 33 wt %, is observed. The higher concentration of tertiary amine salt of camphorsulfonic acid does not cause any problems (e.g., has no negative impact on slat rejection), but does not yield any additional benefit over that achieved using about 33 wt % tertiary amine salt of camphorsulfonic acid in the backside treatment solution.

The backside treatment solution can be aqueous. The backside treatment solution can include a solvent miscible with water. For example, the backside treatment solution can include a $C_1$-$C_4$ alcohol, a $C_1$-$C_4$ ketone, a glycol, a polyalkylene glycol, or a mono- or di-alkyl ethers of ethylene glycol, or any combination thereof. Exemplary water-miscible solvents include methanol, ethanol, propanol, isopropanol, tert-butanol, acetone, dimethylketone, methylethyl ketone, ethylene glycol mono acetate, ethylene glycol, propylene glycol, hexylene glycol, and a polyethylene glycol of molecular weight approximately 400 or less, and mixtures thereof. The backside solution can contain water and a water-miscible solvent. When present, the water-miscible solvent can be present in an amount that does not interfere with the solubility of the tertiary amine salt of camphorsulfonic acid. In some instance, the water-miscible solvent can be present in an amount from about 0.01 wt % to about 50 wt % based on the weight of the backside treatment solution.

The backside treatment solution can include a surfactant or a polar aprotic solvent, or a combination thereof. The amount of surfactant or polar aprotic solvent in the backside treatment solution can be from about 0.001 wt % to about 10 wt % based on the weight of the backside treatment solution. Exemplary polar aprotic solvents include dimethylformamide, dimethylacetamide, tetrahydrofuran, dimethyl sulfoxide, 1,3-dimethyl-2-imidazolidinone, diethyl ether, N-methyl-2-pyrrolidone, dichloromethane, ethyl acetate, methyl acetate, isopropyl acetate, acetone, methyl ethyl ketone, methyl isobutyl ketone, acetonitrile and any combination thereof.

If present, the surfactant can be selected from among nonionic, cationic, anionic, and zwitterionic surfactants. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyltrimethyl ammonium bromide or chloride, hexadecyltrimethylammonium bromide or chloride, and alkyl betaines. Preferred among these are SLS, octylphenol ethoxylates, and ethoxylated nonylphenols. In some embodiments, the amount of surfactant in the backside treatment solution can be from about 0.005 wt % to about 5 wt %, or from about 0.01 wt % to about 1 wt % based on the weight of the backside treatment solution.

The backside treatment solution can have a pH greater than 5, or greater than 6, or greater than 7, or greater than 8 or greater than 9. The backside treatment solution can have a pH of from about 5 to about 10. A pH from about 6 to about 10 is preferred.

The backside treatment solution can be applied to the backside of the TFC membrane at any temperature. Generally, the temperature of the backside treatment solution is less than 90° C., or less than 80° C., or less than 70° C., or less than 60° C., or less than 50° C. when applied to the backside of the TFC membrane. In some embodiments, the temperature of the backside treatment solution when applied is ambient temperature. For example, the temperature of the backside treatment solution can be from about 10° C. to about 40° C. at time of application.

The backside treatment solution can be applied to the backside of the TFC membrane at any pressure. In some instances, the backside treatment solution is applied at ambient pressure, such as from about 0.98 atmosphere (atm) to about 1 atm, or from about 101.32 kPa to about 101.325 kPa, or from about 14.4 psi to about 14.7 psi. The backside treatment solution can be applied to the backside of the TFC membrane at an elevated pressure. The application pressure can be, e.g., from about 15 psi to about 75 psi.

Figure 2:
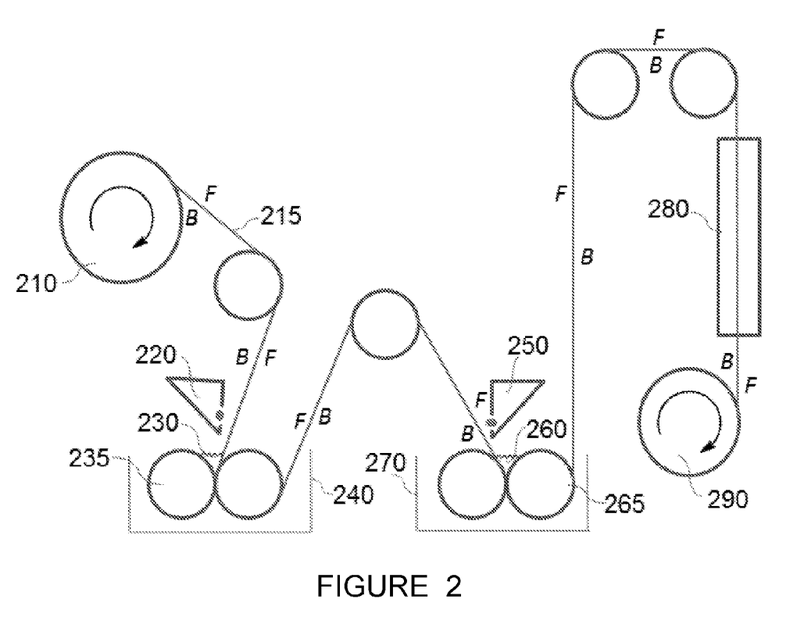
FIG. 2 is a schematic drawing of an exemplary embodiment of a process line for applying the backside treatment solution containing a pore structure protection agent to the backside of a TFC membrane using a puddle coating technique. The arrows show the direction of rotation of the unwind roll and take-up roll. B indicates the backside of the TFC membrane and F indicates the frontside of the TFC membrane.

The backside treatment solution can be applied to the backside 150 of the TFC membrane using any known technique, such as dipping, immersing, coating, spraying, or any combination thereof. An exemplary technique is illustrated in FIG. 2, which shows a puddle technique. In such processes, a TFC membrane 215 on unwind roll 210 is directed to backside treating area 240, where a bead or puddle of the of the backside treatment solution 230 is maintained between a backside roller 235 and the backside B of the TFC membrane 215 using gravity and slight overflow at the edges of the TFC membrane 215 web. The backside treatment solution is fed to the center of the puddle using backside treatment solution feed 220 at a rate sufficient to maintain a puddle of backside treatment solution 230. The application rate can be adjusted up or down depending on the line speed (the speed at which the TFC membrane moves through the system). The applied backside treatment solution spreads between the backside roller 235 and the backside B of the TFC membrane 215 to form a puddle of backside treatment solution 230, applying a coating of the backside treatment solution to the membrane to form a treated membrane that exits backside treating area 240. The treated membrane can be dried and stored for further use, such as to be incorporated into a module.

The process easily can be integrated into a process that includes application of a coating to the frontside 110 of the TFC membrane. Still referring to FIG. 2, the treated membrane also can be directed from the backside treating area 240 to a frontside coating area 270 where a frontside coating can be applied. The frontside coating is applied to the TFC membrane on the frontside F of the TFC membrane 215. The frontside of the membrane will be exposed to the feed solution in use. The application of the frontside coating can be accomplished using any convenient technique, such as dipping, immersing, coating, spraying, or any combination thereof. In FIG. 2, the frontside coating is shown applied using a puddle coating technique. As shown in FIG. 2, the backside-treated TFC membrane enters frontside coating area 270 where a bead or puddle of the of the frontside coating solution 260 is maintained between a frontside roller 265 and the frontside F of the TFC membrane 215 using gravity and slight overflow at the edges of the TFC membrane 215 web. The frontside coating solution 260 is fed to the center of the puddle using frontside coating solution feed 250 at a rate sufficient to maintain a puddle of frontside coating solution 260. The application rate can be adjusted up or down depending on the line speed (the speed at which the TFC membrane moves through the system) to achieve the desired coating. The applied frontside coating solution 260 spreads between the frontside roller 265 and the frontside F of the TFC membrane 215 to form a coated membrane that exits frontside coating area 270.

The coated membrane is directed to a drying area 280 to dry the treated and coated TFC membrane. Drying can be accomplished using any technique, such as by using forced air dryers, heated forced air dryers, IR dryers, UV dryers, or any combination thereof. The temperature and speed of the web through the dryer or dryers can be adjusted so that temperature of a surface of the web reaches a temperature sufficient to evaporate at least a portion of the solvents of the backside treatment solution and the coating solution. The temperature and speed of the web through the dryer or dryers can be adjusted so that temperature of the web or at least one surface thereof reaches a temperature of at least 75° C., at least 80° C., or at least 85° C., or at least 90° C., or at least 95° C. When the solvent of the coating solution evaporates or is dried, a thin polymer layer or film is left behind on the frontside of the TFC membrane. The dried membrane is collected on take-up roll 290.

As discussed above, the frontside coating solution can contain any of the polymers known and used in the art as a finishing coating or protective coating. Examples of such polymers include polyvinyl alcohol, polyvinylpyrrolidone, polyethylene, polypropylene, polyethersulfone, polyvinylidene fluoride, polytetrafluoroethylene, polyethylene terephthalate, polytrimethylene terephthalate, polybutylene terephthalate, polystyrene, polyacrylonitrile, polymethyl methacrylate, polyvinyl acetate polyalcohols, polyalkylene oxides, polyimines, polyacrylic acids, polyacrylonitrile, polyamines, polyurethanes, polyureas, and derivatives thereof and copolymers thereof. An exemplary coating contains 2 wt % polyvinyl alcohol.

The coating solution includes a solvent to at least partially solvate the polymer. The solvent can be selected to completely solvate the polymer. Exemplary solvents include water, a $C_1$-$C_4$ alcohol, a $C_1$-$C_4$ ketone, a glycol, a polyalkylene glycol, or a mono- or di-alkyl ethers of ethylene glycol, or any combination thereof. For example, the solvent can include water, methanol, ethanol, propanol, isopropanol, tert-butanol, acetone, dimethylketone, methylethyl ketone, ethylene glycol mono acetate, ethylene glycol, propylene glycol, hexylene glycol, or a polyethylene glycol of molecular weight approximately 400 or less, or a combination thereof.

The coating solution is generally fairly dilute with respect to the polymer, but generally contains at least 0.1 wt % polymer, or at least 0.5 wt % polymer. The coating solution can contain polymer in an amount from about 0.1 wt % to about 10 wt % polymer, or from about 0.25 wt % to about 5 wt % polymer, or from about 0.1 wt % to about 5 wt % polymer, or from about 0.5 wt % to about 2.5 wt % polymer.

The coating solution can include a humectant. Examples of humectants that can be included in the coating solution include glycerol, polyglycerol, polyethylene glycol, an alkylene glycol such as propylene glycol and butylene glycol, a sugar alcohol such as sorbitol or xylitol, and any combination thereof. When present, the amount of humectant in the coating solution can be at least 0.1 wt %, or at least 0.5 wt %, or at least 1 wt %, or at least 5 wt %, or at least 10 wt %. The amount of humectant in the coating solution can be from about 0.1 wt % to about 40 wt %, or from about 0.5 wt % to about 25 wt %. An exemplary coating contains 2 wt % polyvinyl alcohol and 2 wt % glycerol.

After application of the coating solution to the TFC membrane and evaporation of the solvent, a polymer film coating is left on the membrane. The dried polymer film coating is typically less than about 30 microns thick, and can be less than about 5 microns thick. The dried polymer film coating can be less than 1 micron thick, or less than 500 nm thick, or in the range of from about 50 to about 500 nm.

Figure 3:
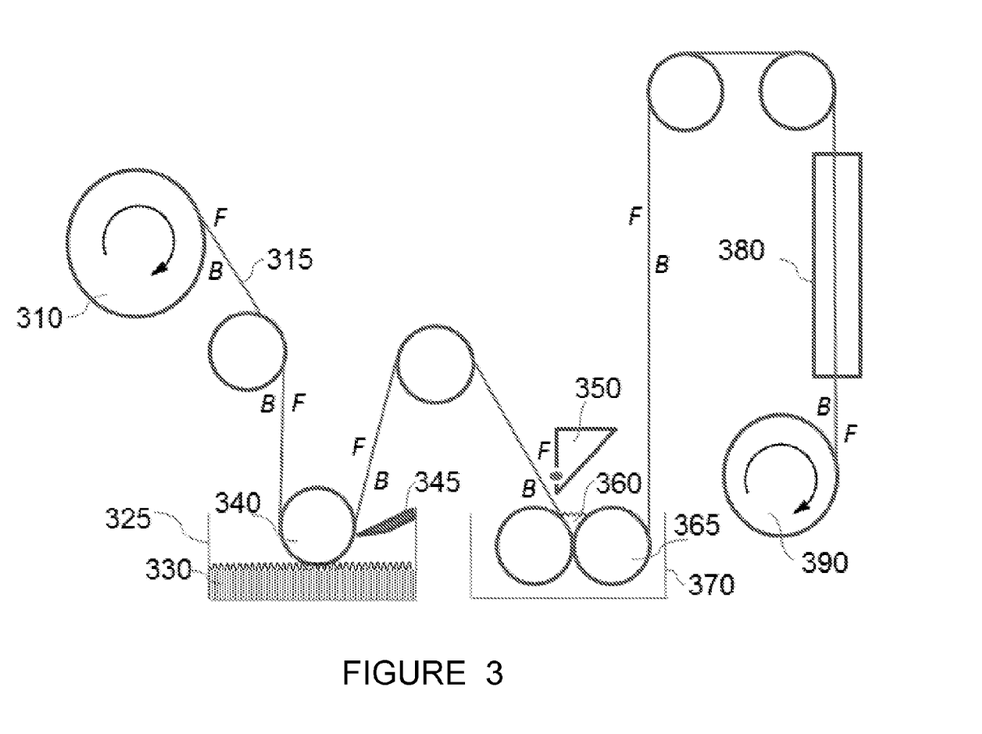
FIG. 3 is a schematic drawing of an exemplary embodiment of a process line for applying the backside treatment solution containing a pore structure protection agent to the backside of a TFC membrane using a bath coating technique. The arrows show the direction of rotation of the unwind roll and take-up roll. B indicates the backside of the TFC membrane and F indicates the frontside of the TFC membrane.

The backside treatment solution also can be applied to the backside 150 of the TFC membrane using a dipping technique, e.g., as illustrated in FIG. 3. In such coating processes, a TFC membrane 315 on unwind roll 310 is carried over roller 340 into and through dip coating tank 325 which contains backside treatment solution 330, which treats the backside B of the travelling TFC membrane 315 with the backside treatment solution 330 resulting in a treated membrane. Any excess backside treatment solution 330 can be removed at excess removal station 345, which can include any apparatus or technique to remove excess backside treatment solution, such as an air knife, a rubber wiper blade, a nip roller, a sponge, or any combination thereof, or other device or process. The treated membrane exits backside coating area 340. The treated membrane can be dried and stored for further use, such as to be incorporated into a module.

The process easily can be integrated into a process that includes application of a coating to the frontside of the TFC membrane. Still referring to FIG. 3, the treated membrane also can be directed from backside coating area 340 to a frontside coating area 370 where a frontside coating is applied. The frontside coating is applied to the TFC membrane on the frontside F of the TFC membrane 315. The frontside F of the membrane will be exposed to the feed solution in use. The application of the frontside coating can be accomplished using any convenient technique, such as dipping, immersing, coating, spraying, or any combination thereof. In FIG. 3, the frontside coating is shown applied using a puddle coating technique. The backside-treated TFC membrane enters frontside coating area 370 where a bead or puddle of the of the frontside coating solution 360 is maintained between a frontside roller 365 and the frontside F of the TFC membrane 315 using gravity and slight overflow at the edges of the TFC membrane 315 web. The frontside coating solution 360 is fed to the center of the puddle using frontside coating solution feed 350 at a rate sufficient to maintain a puddle of frontside coating solution 360. The application rate can be adjusted up or down depending on the line speed to achieve the desired coating. The applied frontside coating solution 360 spreads between the frontside roller 365 and the frontside F of the TFC membrane 315 to form a coated membrane that exits frontside coating area 370 and is directed to a drying area 380 to dry the treated and coated TFC membrane. The dried membrane is collected on take-up roll 390.

E. Modules

For use, the membranes can be housed in membrane modules. Spiral-wound modules, the standard for the industry, are preferred. The TFC membranes produced using the processes described herein can be spirally wound around a central porous permeate collection tube to produce a semipermeable membrane module for use in a pressure vessel. Representative examples of spiral wound filtration modules, corresponding fabrication techniques and modes of operation are described in U.S. Pat. Nos. 4,842,736; 5,096,584; 5,114,582; 5,147,541; 5,538,642; 5,681,467; 6,277,282; and 6,881,336; and in U.S. Pat. Pub. Nos. US 2007/0272628 and US 2008/0295951. The module includes at least one membrane envelope concentrically wound about a permeate collection tube. The membrane envelope is preferably formed from one or more membrane sheets which are sealed about a portion of their periphery. An edge of the membrane envelope is axially aligned along a permeate collection tube such that the membrane envelope is in fluid communication with the permeate collection tube but is otherwise sealed from feed fluid passing across the outer surface of the membrane envelope.

A typical spirally wound semipermeable membrane module includes a plurality of leaves that are individual envelopes of sheet-like semipermeable membrane material that sandwich therebetween a layer of porous permeate carrying material, such as polyester fibrous sheet material. The semipermeable membrane material includes the membranes produced using the processes described herein.

Interleaved between adjacent leaves generally are lengths of spacer material, which may be woven or non-woven or other open mesh, screen-like crosswise designs of synthetic filaments, e.g. cross-extruded filaments of polypropylene, that provide flow passageways for the feed water being pumped from end to end through the pressure vessel. An appropriate lay-up of such alternating leaves and spacer sheets is then spirally wound about a hollow tube having a porous sidewall to create a right circular cylindrical module.

Modules containing membranes produced using the processes described herein can be used to produce a stream of potable water from sea water at a pressure of about 800 psi or less. Modules containing membranes produced using the processes described herein can be used to produce a stream of potable water from brackish water at relatively low pressure conditions, i.e. not greater than about 225 psi, and in some embodiments at pressures of about 150 psi or less. These low pressure conditions can permit the use of pressure vessels, pumps, valves, and piping having a more moderate pressure rating than usually require for reverse osmosis systems and to thereby avoid the cost of expensive high pressure RO systems. This substantially reduces not only initial capital costs but operating costs as well, compared to standard high pressure sea water desalination systems. Capital costs can be significantly reduced because operating pressures are about one-half to about two-thirds of those used in conventional sea water desalinization systems and pressure vessels rated for a pressure of about 225 psi or below can be used, avoiding the costs associated with design and fabrication of high pressure vessels. In addition, because the operating pressure is lower than that required for conventional sea water RO desalinization installations, the power costs are lower.

As an alternative to preparing the membranes in flat-sheet form, the membranes can be formed as hollow fibers, as is known in the art. Hollow fiber membranes can be potted into hollow fiber modules (e.g., see U.S. Pat. Nos. 5,032,268; 5,160,673; 5,183,566; 5,484,528; and 8,551,388 and U.S. Pat. Appl. Pub. Nos. 2011/0031180 and 2015/0107455).

F. Membrane Characteristics

Water flux can be determined by measuring permeate flow using Equation 1:

$$\text{Flux } (gfd) = \frac{\text{permeate (gallons)}}{\text{membrane area}(ft^2) \cdot \text{time (day)}}$$

Salt rejection (R, in %) can be calculated using Equation 2:

$$R(\%) = \left(1 - \frac{Cp}{Cf}\right) \times 100$$

where $C_f$ is the concentrations of salt in the feed water and the ($C_p$ is the concentrations of salt in the permeate, both of which can be measured using a calibrated conductivity meter.

G. Examples

The following examples are included for illustrative purposes only and are not intended to limit the scope of the embodiments provided herein.

Example 1

Preparation of Sea Water Membrane

An aqueous phase was prepared. The aqueous phase contained 4.5 wt % triethylammonium camphorsulfonate (TEACSA, Sunland Chemicals, Los Angeles, Calif.) and 4 wt % m-phenylene diamine (MPD, Dupont, Wilmington, Del.). The aqueous phase was prepared by first adding the DI water to a mixing vessel, followed by addition of the TEACSA and MPD, although any order of addition can be used.

An organic phase was prepared. The organic phase solution contained 0.2 wt % TMC (Sigma Aldrich, St. Louis, Mo.) in an isoparafinnic solvent, Isopar™ G solvent (a low odor, low aromatic hydrocarbon solvent from ExxonMobile Chemical Company, Houston, Tex.). The organic phase was prepared by placing the Isopar G in a vessel and mixing in the TMC.

Membrane Formation

A polyester non-woven reinforced polysulfone support was used. The aqueous phase was applied to the polysulfone support at ambient temperature (25° C.) and pressure (1 atm). After 10 seconds, any excess aqueous solution remaining on the surface of the support layer was absorbed or pushed with a roller to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the web reaching a temperature of 95° C. The membrane remained in the oven for 6 minutes.

Example 2

Preparation of Brackish Water Membrane

An aqueous phase was prepared. The aqueous phase contained 6.75 wt % triethylammonium camphorsulfonate (TEACSA, Sunland Chemicals, Los Angeles, Calif.) and 3.5 wt % m-phenylene diamine (MPD, Dupont, Wilmington, Del.). The aqueous phase was prepared by first adding the DI water to a mixing vessel, followed by addition of the TEACSA and MPD, although any order of addition can be used.

An organic phase was prepared. The organic phase solution contained 0.25 wt % TMC (Sigma Aldrich, St. Louis, Mo.) in an isoparafinnic solvent, Isopar™ G solvent (a low odor, low aromatic hydrocarbon solvent from ExxonMobile Chemical Company, Houston, Tex.). The organic phase was prepared by placing the Isopar G in a vessel and mixing in the TMC.

Membrane Formation

A polyester non-woven reinforced polysulfone support was used. The aqueous phase was applied to the polysulfone support at ambient temperature (25° C.) and pressure (1 atm). After 10 seconds, any excess aqueous solution remaining on the surface of the support layer was absorbed or pushed with a roller to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the membrane reaching a temperature of 95° C. The membrane remained in the oven for 6 minutes.

Comparative Examples 3 and 4

Drying without Backside Treatment

After formation of each of the membranes described in Examples 1 and 2, each membrane was rinsed with 60° C. water several times to eliminate any excess residual compounds in the membrane. After rinsing, each membrane was dried in an oven with the membrane reaching a temperature of 95° C. Each membrane remained in the oven for 6 minutes.

Membrane performance was measured in a flat sheet cell test apparatus. The testing was conducted at a Reynolds number of 2500, so that build-up of rejected solutes at the membrane surface leads to a concentration no more than 10% higher than that in the bulk. Testing for Comparative Example 3 was performed on sea water (SW, 32,000 ppm NaCl in deionized or RO water) at 800 psi, at 25° C. Testing for Comparative Example 4 was performed on brackish water (BW, 2,000 ppm NaCl in deionized or RO water) at 225 psi, at 25° C. Membranes were run for 1 hour before performance characteristics (e.g., water flux and salt rejection) were measured. Two membranes of each condition, with 3 coupons in one membrane, were tested, so that a total of 6 coupon replicates were tested to arrive at an average value and the stated standard deviation.

Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using the Equation 2. The results for each comparative Example are shown in Table 1.

TABLE 1

| | Flux (gfd) | | Rejection (%) | |
| --- | --- | --- | --- | --- |
| | Average | Standard Deviation | Average | Standard Deviation |
| Comparative Ex. 3 (Membrane of Example 1) Dried No Backside Treatment (SW, 800 psi, 32000 ppm NaCl) | 10.2 | 0.5 | 99.77 | 0.04 |
| Comparative Ex. 4 (Membrane of Example 2) Dried No Backside Treatment BW, (225 psi, 2000 ppm NaCl) | 12.3 | 0.8 | 99.65 | 0.05 |

Comparative Examples 5 and 6 and Examples 7 and 8

Drying with Backside Treatment

After formation of each of the membranes described in Examples 1 and 2, each membrane was rinsed with 60° C. water several times to eliminate any excess residual compounds in the membrane. Separate membranes of Example 1 and Example 2 were then treated on the backside with a 10 wt % solution of sodium citrate (Comparative Examples 5 and 6) or with 10 wt % solution of TEACSA (Examples 7 and 8). The solution containing the sodium citrate or the TEACSA was applied to the backside of the TFC membrane at ambient temperature (25° C.) and pressure (1 atm) and after 10 seconds, the orientation of the membrane was changed to allow any excess solution to drain away, and the membrane was allowed to drain for 10 seconds. Each of the treated membranes was then dried in an oven with the membrane reaching a temperature of 95° C. Each membrane remained in the oven for 6 minutes.

Membrane performance was measured in a flat sheet cell test apparatus. The testing was conducted at a Reynolds number of 2500, so that build-up of rejected solutes at the membrane surface leads to a concentration no more than 10% higher than that in the bulk. Testing for Comparative Example 5 and Example 7 was performed on sea water (SW, 32,000 ppm NaCl in deionized or RO water) at 800 psi, at 25° C. Testing for Comparative Example 6 and Example 8 was performed on brackish water (BW, 2,000 ppm NaCl in deionized or RO water) at 225 psi, at 25° C. Membranes were run for 1 hour before performance characteristics (e.g., water flux and salt rejection) were measured. Two membranes of each condition, with 3 coupons in one membrane, were tested, so that a total of 6 coupon replicates were tested to arrive at an average value and the stated standard deviation.

Water flux and rejection were determined as described above. The results are shown in Table 2.

TABLE 2

Membrane Performance with Backside Treatment

| | Flux (gfd) | | Rejection (%) | |
| --- | --- | --- | --- | --- |
| | Average | Standard Deviation | Average | Standard Deviation |
| Sea water Membranes | | | | |
| Sea water test, 800 psi, 32000 ppm NaCl | | | | |
| Comp. Ex. 3 - Control | 10.2 | 0.5 | 99.77 | 0.04 |
| Comp. Ex. 5 - Dried w/10% Na citrate | 14.1 | 0.6 | 99.78 | 0.05 |
| Change from control (%) | 38.24 | — | 0.01 | — |
| Example 7 - Dried w/10% TEACSA | 14.6 | 0.6 | 99.82 | 0.01 |
| Change from control (%) | 43.14 | — | 0.05 | — |
| Brackish Water Membranes | | | | |
| Brackish water test, 225 psi, 2000 ppm NaCl | | | | |
| Comp. Ex. 4 - Control | 12.3 | 0.8 | 99.65 | 0.05 |
| Comp. Ex. 6 - Dried w/10% Na citrate | 14.7 | 0.6 | 99.64 | 0.07 |
| Change from control (%) | 19.51 | — | −0.01 | — |
| Example 8 - Dried w/10% TEACSA | 18.8 | 0.2 | 99.68 | 0.04 |
| Change from control (%) | 52.85 | — | 0.03 | — |

As can be seen from the data, backside treatment of the TFC membrane with an aqueous solution containing 10 wt % TEACSA post-rinsing after formation of the discrimination layer and prior to drying significantly improved the water flux of the membrane while maintaining salt rejection compared to control membranes prepared without application of a pore structure protection agent to the backside of the membrane.

With sea water TFC membranes, water flux improvement was better than that achieved by applying a 10 wt % solution of sodium citrate to the backside of the membrane prior to drying the membrane. With brackish water TFC membranes, large membrane flux improvements were realized using 10 wt % TEACSA as a pore structure protection agent in a backside treatment solution. Compared to an untreated control, more than a 50% improvement in water flux through the membrane was achieved in the membrane treated on the backside with 10 wt % TEACSA. The improvement in water flux was almost three times that observed in a membrane treated on the backside with 10 wt % sodium citrate. Without being restricted to any particular theory, it is believed that the lower pressures driving permeation under brackish conditions are related to the significant flux improvement for brackish membrane compared to sea water membranes because, under brackish conditions, restrictions to flow caused by pore collapse could have a more significant effect because there is less driving force to overcome the restrictions caused by collapsed pores.

Examples 9 Through 16

Varying Amounts of TEACSA in Backside Treatment

The effect of concentration of the tertiary amine salt in the backside treatment prior to drying on membrane performance was measured. After formation of each of the membranes described in Examples 1 and 2, each membrane was rinsed with 60° C. water several times to eliminate any excess residual compounds in the membrane. Separate membranes of Example 1 and Example 2 were then treated on the backside with solutions of TEACSA of varying concentrations. For the sea water membranes of Example 1, Example 9 was treated with 5 wt % TEACSA, Example 10 was treated with 10 wt % TEACSA, Example 11 was treated with 20 wt % TEACSA, Example 12 was treated with 30 wt % TEACSA, and Example 13 was treated with 40 wt % TEACSA. For the brackish water membranes of Example 2, Example 14 was treated with 5 wt % TEACSA, Example 15 was treated with 10 wt % TEACSA, Example 16 was treated with 20 wt % TEACSA, Example 17 was treated with 30 wt % TEACSA, and Example 18 was treated with 40 wt %.

The solution containing the TEACSA was applied to the backside of the TFC membrane at ambient temperature (25° C.) and pressure (1 atm) and after 10 seconds, the orientation of the membrane was changed to allow any excess solution to drain away, and the membrane was allowed to drain for 10 seconds. Each of the treated membranes was then dried in an oven with the membrane reaching a temperature of 95° C. Each membrane remained in the oven for 6 minutes.

Membrane performance was measured in a flat sheet cell test apparatus as described above. The testing was conducted at a Reynolds number of 2500, so that build-up of rejected solutes at the membrane surface leads to a concentration no more than 10% higher than that in the bulk. Testing for Examples 9-12 was performed on sea water (SW, 32,000 ppm NaCl in deionized or RO water) at 800 psi, at 25° C. Testing for Examples 13-16 was performed on brackish water (BW, 2,000 ppm NaCl in deionized or RO water) at 225 psi, at 25° C. Membranes were run for 1 hour before performance characteristics (e.g., water flux and salt rejection) were measured. Two membranes of each condition, with 3 coupons in one membrane, were tested, so that a total of 6 coupon replicates were tested to arrive at an average value and the stated standard deviation. Water flux and rejection were determined as described above. The results are shown in Table 3.

TABLE 3

Membrane Performance

| | Flux (gfd) | | Rejection (%) | |
|---|---|---|---|---|
| | Average | Standard Deviation | Average | Standard Deviation |
| Sea water Membranes | | | | |
| Sea water test, 800 psi, 32000 ppm NaCl | | | | |
| Comp. Ex. 3 - Control | 10.2 | 0.5 | 99.77 | 0.04 |
| Example 9 Dried w/5% TEACSA | 14.3 | 0.6 | 99.79 | 0.05 |
| Change from control (%) | 40.20 | — | 0.02 | — |
| Example 10 - Dried w/10% TEACSA | 14.6 | 0.6 | 99.82 | 0.01 |
| Change from control (%) | 43.14 | — | 0.05 | — |
| Example 11 Dried w/20% TEACSA | 14.5 | 0.4 | 99.81 | 0.02 |
| Change from control (%) | 42.16 | — | 0.04 | — |
| Example 12 - Dried w/30% TEACSA | 14.5 | 0.4 | 99.77 | 0.03 |
| Change from control (%) | 42.16 | — | 0 | — |
| Example 13 - Dried w/40% TEACSA | 14.2 | 0.3 | 99.76 | 0.02 |
| Change from control (%) | 39.22 | — | −0.01 | — |
| Brackish Water Membranes | | | | |
| Brackish water test, 225 psi, 2000 ppm NaCl | | | | |
| Comp. Ex. 4 - Control | 12.3 | 0.8 | 99.65 | 0.05 |
| Example 14 Dried w/5% TEACSA | 17.9 | 0.4 | 99.69 | 0.03 |
| Change from control (%) | 45.53 | — | 0.04 | — |
| Example 15 - Dried w/10% TEACSA | 18.8 | 0.2 | 99.68 | 0.04 |
| Change from control (%) | 52.85 | — | 0.03 | — |
| Example 16 Dried w/20% TEACSA | 18.7 | 0.5 | 99.67 | 0.06 |
| Change from control (%) | 52.03 | — | 0.02 | — |
| Example 17 - Dried w/30% TEACSA | 18.4 | 0.5 | 99.68 | 0.02 |
| Change from control (%) | 49.59 | — | 0.03 | — |
| Example 18 - Dried w/40% TEACSA | 17.8 | 0.7 | 99.66 | 0.04 |
| Change from control (%) | 44.71 | — | 0.01 | — |

For sea water membranes, improved water flux performance of the membranes was observed for each tested concentration of TEACSA. As the concentration of TEACSA increased from 5 wt % to 10 wt %, water flux exhibited an associated increase. The change in water flux from 20 wt % TEACSA to 30 wt % TEACSA was roughly equivalent. Application to the backside of the membrane of amounts of 40 wt % TEACSA did not have any additional positive effect on water flux, nor did it have any substantial negative impact on salt rejection for sea water membranes.

For brackish water membranes, improved water flux performance of the membranes was observed for each tested concentration of TEACSA. As the concentration of TEACSA increased from 5 wt % to 20 wt %, water flux exhibited an associated increase. The water flux of the membrane backside-treated with 30 wt % TEACSA was significantly better than the control, but less than that observed with backside treatment with 20 wt % TEACSA while maintaining salt rejection. The water flux of the membrane backside-treated with 40 wt % TEACSA was significantly better than the control, but less than that observed with backside treatment with 20 wt % TEACSA while maintaining salt rejection.

Comparative Examples 19 and 20 and Example 21

SW Membrane—Backside Treatment with Frontside Coating

The effect of backside treatment prior to frontside coating and drying on the performance of a sea water membrane was investigated.

A sea water membrane using the formulation for the discrimination layer described in Example 1 was prepared. An apparatus for the continuous fabrication of a polymer membrane was used to cast the TFC membrane. A polyester non-woven reinforced polysulfone support was used as the microporous support. The aqueous phase was applied to the microporous support by dip-coating, by running a length of microporous support membrane through a coating bath containing the aqueous amine solution. The aqueous phase was applied to the constantly moving polysulfone support at ambient temperature (25° C.) and pressure (1 atm). After about 10 seconds, any excess aqueous solution remaining on the surface of the support layer was absorbed or pushed with a roller to remove any droplets, resulting in a treated support. The treated support then was brought into contact with the organic phase. Contact with the organic phase was achieved by passing the moving treated support through a second bath containing the organic phase, although the organic phase also could have been applied as a vapor by spraying it onto the treated support. Once brought into contact, the amine and acid chloride reacted at the solution interface to form a crosslinked polyamide discrimination layer. The TFC membrane containing the discrimination layer was withdrawn from the bath, washed in a series of rinsing steps in a rinsing station, and moved to a puddle coating station, having an area for backside treatment and an area for frontside coating, similar to the exemplary schematic depicted in FIG. 2.

Upon entering the backside treatment area, a backside treatment solution was applied to the backside of the TFC membrane using a puddle coating technique, where a bead of the backside treatment solution was maintained between a backside roller and the backside of the membrane using gravity and slight overflow at the edges of the web. The backside treatment solution was fed to the center of the bead at a rate of about 130 mL/min with the coater line speed of about 25 feet per minute.

For Comparative Example 19, the backside treatment solution was deionized water only. For Comparative Example 20, the backside treatment solution contained 10 wt % sodium citrate in deionized water. For Example 21, the backside treatment solution contained 10 wt % TEACSA in deionized water.

After exiting the backside treatment area, the backside-treated TFC membrane was directed to the frontside coating area. Upon entering the frontside coating area, a coating solution containing 2 wt % polyvinyl alcohol in deionized water was applied to the frontside of the TFC membrane using a puddle coating technique, where a bead of the coating solution was maintained between a frontside roller and the frontside of the membrane using gravity and slight overflow at the edges of the web. The frontside coating solution was fed to the center of the bead at a rate of about 130 mL/min with the coater line speed of about 25 feet per minute. After exiting the frontside coating area, the coated TFC membrane was directed to a drying chamber. The drying chamber heated the membrane to remove residual solvent, and the dryer was adjusted so that the membrane reached a temperature of about 95° C.

Membrane performance was measured in a flat sheet cell test apparatus as described above. The testing was conducted at a Reynolds number of 2500, so that build-up of rejected solutes at the membrane surface leads to a concentration no more than 10% higher than that in the bulk. Testing was performed on sea water (SW, 32,000 ppm NaCl in deionized or RO water) at 800 psi, at 25° C. Membranes were run for 1 hour before performance characteristics (e.g., water flux and salt rejection) were measured. Two membranes of each condition, with 3 coupons in one membrane, were tested, so that a total of 6 coupon replicates were tested to arrive at an average value and the stated standard deviation. Water flux and rejection were determined as described above. The results are shown in Table 4.

TABLE 4

Membrane Performance of Coated SW Membrane Sea water Membranes

| Sea water test, 800 psi, 32000 ppm NaCl | Flux (gfd) | | Rejection (%) | |
|---|---|---|---|---|
| | Average | Standard Deviation | Average | Standard Deviation |
| Comp. Ex. 3 - Control | 10.2 | 0.5 | 99.77 | 0.04 |
| Comp. Example 19 PVOH frontside only | 11.4 | 0.03 | 99.81 | 0.00 |
| Change from control (%) | 11.76 | — | 0.04 | — |
| Comp. Example 20 - 10% citrate backside PVOH frontside | 14.2 | 0.05 | 99.78 | 0.01 |
| Change from control (%) | 39.22 | — | 0.01 | — |
| Example 21 - 10% TEACSA backside PVOH frontside | 15.1 | 0.04 | 99.80 | 0.02 |
| Change from control (%) | 48.04 | — | 0.03 | — |

The data show that backside treatment with 10 wt % TEACSA as a pore structure protection agent prior to coating the frontside of the membrane with 2 wt % PVOH significantly improved water flux of a sea water membrane while maintaining salt rejection of the membrane. The improvement achieved in water flux was significantly better than that achieved by coating the backside with an equivalent amount of sodium citrate prior to coating the frontside with PVOH.

Comparative Examples 22 and 23 and Example 24

BW Membrane—Backside Treatment and Frontside Coating

The effect of backside treatment prior to frontside coating and drying on the performance of a brackish water membrane was investigated.

A BW membrane using the formulation for the discrimination layer described in Example 2 was prepared. An apparatus for the continuous fabrication of a polymer membrane was used to cast the TFC membrane. A polyester non-woven reinforced polysulfone support was used as the microporous support. The aqueous phase was applied to the microporous support by dip-coating, by running a length of microporous support membrane through a coating bath containing the aqueous amine solution. The aqueous phase was applied to the constantly moving polysulfone support at ambient temperature (25° C.) and pressure (1 atm). After about 10 seconds, any excess aqueous solution remaining on the surface of the support layer was absorbed or pushed with a roller to remove any droplets, resulting in a treated support. The treated support then was brought into contact with the organic phase. Contact with the organic phase was achieved by passing the moving treated support through a second bath containing the organic phase, although the organic phase also could have been applied as a vapor by spraying it onto the treated support. Once brought into contact, the amine and acid chloride reacted at the solution interface to form a crosslinked polyamide discrimination layer. The TFC membrane containing the discrimination layer was withdrawn from the bath, washed in a series of rinsing steps in a rinsing station, and moved to a puddle coating station, having an area for backside treatment and an area for frontside coating, similar to the exemplary schematic depicted in FIG. 2.

Upon entering the backside treatment area, a backside treatment solution was applied to the backside of the TFC membrane using a puddle coating technique, where a bead of the backside treatment solution was maintained between a backside roller and the backside of the membrane using gravity and slight overflow at the edges of the web. The backside treatment solution was fed to the center of the bead at a rate of about 130 mL/min with the coater line speed of about 25 feet per minute.

For Comparative Example 22, the backside treatment solution was deionized water only. For Comparative Example 23, the backside treatment solution contained 10 wt % sodium citrate in deionized water. For Example 24, the backside treatment solution contained 10 wt % TEACSA in deionized water.

After exiting the backside treatment area, the backside-treated TFC membrane was directed to the frontside coating area. Upon entering the frontside coating area, a coating solution containing 2 wt % polyvinyl alcohol and 2 wt % glycerol in deionized water was applied to the frontside of the TFC membrane using a puddle coating technique, where a bead of the coating solution was maintained between a frontside roller and the frontside of the membrane using gravity and slight overflow at the edges of the web. The frontside coating solution was fed to the center of the bead at a rate of about 130 mL/min with the coater line speed of about 25 feet per minute. After exiting the frontside coating area, the coated TFC membrane was directed to a drying chamber. The drying chamber heated the membrane to remove residual solvent, and the dryer was adjusted so that the surface of the membrane reached a temperature of about 95° C.

Membrane performance was measured in a flat sheet cell test apparatus as described above. The testing was conducted at a Reynolds number of 2500, so that build-up of rejected solutes at the membrane surface leads to a concentration no more than 10% higher than that in the bulk. Testing was performed on brackish water (BW, 2,000 ppm NaCl in deionized or RO water) at 225 psi, at 25° C. Membranes were run for 1 hour before performance characteristics (e.g., water flux and salt rejection) were measured. Two membranes of each condition, with 3 coupons in one membrane, were tested, so that a total of 6 coupon replicates were tested to arrive at an average value and the stated standard deviation. Water flux and rejection were determined as described above. The results are shown in Table 5.

TABLE 5

Membrane Performance of Coated BW Membrane Brackish Water Membranes

| Brackish water test, 225 psi, 2000 ppm NaCl | Flux (gfd) | | Rejection (%) | |
| --- | --- | --- | --- | --- |
| | Average | Standard Deviation | Average | Standard Deviation |
| Comp. Ex. 4 - Control | 12.3 | 0.8 | 99.65 | 0.05 |
| Comp. Example 20 PVOH frontside only | 13.2 | 0.5 | 99.68 | 0.04 |
| Change from control (%) | 7.32 | — | 0.03 | — |
| Comp. Example 21 - 10% citrate backside PVOH frontside | 14.6 | 1.0 | 99.67 | 0.02 |
| Change from control (%) | 18.7 | — | 0.02 | — |

TABLE 5-continued

Membrane Performance of Coated BW Membrane Brackish Water Membranes

| Brackish water test, 225 psi, 2000 ppm NaCl | Flux (gfd) | | Rejection (%) | |
| --- | --- | --- | --- | --- |
| | Average | Standard Deviation | Average | Standard Deviation |
| Example 22 - 10% TEACSA backside PVOH frontside | 18.7 | 0.6 | 99.68 | 0.04 |
| Change from control (%) | 52.03 | — | 0.03 | — |

As can be seen from the data, backside treatment with 10 wt % TEACSA as a pore structure protection agent prior to coating the frontside of the membrane with 2 wt % PVOH and 2 wt % glycerol significantly improved water flux of a brackish water membrane while maintaining salt rejection of the membrane. The improvement achieved in water flux was significantly better (almost three times better) than that achieved by coating the backside with an equivalent amount of sodium citrate prior to coating the frontside with PVOH.

It will be apparent to those skilled in the art that various modifications and variation can be made in the present invention without departing from the scope of the invention. Thus, it is intended that the present invention cover the modifications and variations of this invention provided they come within the scope of the appended claims and their equivalents.

REFERENCE NUMERALS LIST

The following is a listing of the reference numerals used in the description and the accompanying Drawings.
100 TFC membrane
110 Frontside of the TFC membrane
120 Discrimination layer
130 Support layer
140 Backside felt layer
150 Backside of the TFC membrane
210 Unwind roll
215 TFC membrane
220 Backside treatment solution feed
230 Backside treatment solution
235 Backside roller
240 Backside treating area
250 Coating solution feed
260 Frontside coating solution
265 Frontside roller
270 Frontside coating area
280 Drying area
290 Take-up roll
310 Unwind roll
315 TFC membrane
325 dip coating tank
330 Backside treatment solution
340 Roller
345 Excess removal station
350 Frontside coating solution feed
360 Frontside coating solution
365 Frontside roller
370 Frontside coating area
380 Drying area
390 Take-up roll
B Backside of TFC membrane
F Frontside of TFC membrane

What is claimed is:

1. A process for improving water flux of a thin film composite (TFC) membrane, comprising:
   (a) providing at least one TFC membrane having at least a felt layer on a backside, a support layer, and a discrimination layer on a front side;
   (b) applying a backside treatment solution containing from about 0.1 wt % to about 33 wt % of a tertiary amine salt of camphorsulfonic acid as a pore structure protection agent to the backside of the TFC membrane to form a backside-treated TFC membrane; and
   (c) drying the backside-treated TFC membrane to yield a treated TFC membrane, the treated TFC membrane having a water flux that is greater than the water flux of a TFC membrane prepared without treating the backside with the backside treatment solution.

2. The process of claim 1, wherein the tertiary amine of the tertiary amine salt of camphorsulfonic acid is selected from among a trialkylamine having 1 to 6 carbon atoms in the alkyl moiety, a pyridine having 0 to 3 alkyl groups of 1 to 6 carbon atoms, an alkyl-alcohol-amine, an N-alkyl-pyrrolidine having 1 to 6 carbon atoms in the alkyl moiety, an alkylbenzylamine, and a heteroaromatic tertiary amines or a combination thereof.

3. The process of claim 1, wherein the tertiary amine of the tertiary amine salt of camphorsulfonic acid is selected from among pyridine, 4-dimethylaminopyridine, quinoline, isoquinoline, phenanthridine, triethylamine (TEA), ethyldiisopropylamine, N,N-dimethyl-cyclohexylamine, N-methylpyrrolidine triethanolamine, methyldiethanolamine, ethyldiethanolamine, dimethylethanolamine, butyldiethanolamine, octadecyl-diethanolamine, cyclohexyldiethanolamine, benzyldiethanolamine. benzylmethylethanolamine, diethyl-ethanolamine, diethyl cyclohexynolamine. methyloctadecyl-ethanolamine, methyl-octadecenylethanolamine, dimethylbenzylamine, and a picoline.

4. The process of claim 1, wherein the backside treatment solution further comprises a solvent selected from among water, a $C_1$-$C_4$ alcohol, a $C_1$-$C_4$ ketone, a glycol, a polyalkylene glycol, a mono-alkyl ether of ethylene glycol and a di-alkyl ether of ethylene glycol, and a combination thereof.

5. The process of claim 1, wherein the discrimination layer comprises a polyamide.

6. The process of claim 1, further comprising applying a coating to the frontside of the TFC membrane.

7. The process of claim 6, the coating comprising from about 0.1 wt % to about 10 wt % of a polymer selected from among polyvinyl alcohol, polyvinylpyrrolidone, polyethylene, polypropylene, polyethersulfone, polyvinylidene fluoride, polytetrafluoroethylene, polyethylene terephthalate, polytrimethylene terephthalate, polybutylene terephthalate, polystyrene, polyacrylonitrile, polymethyl methacrylate, a polyvinyl acetate polyalcohol, a polyalkylene oxide, a polyimine, a polyacrylic acid, a polyacrylonitrile, a polyamine, a polyurethane, and a polyurea, and derivatives thereof and copolymers thereof.

8. The process of claim 7, the coating further comprising from about 0.1 wt % to about 40 wt % of a humectant selected from among glycerol, polyglycerol, polyethylene glycol, an alkylene glycol, and a sugar alcohol, and any combination thereof.

9. The process of claim 1, the drying step comprising heating the treated TFC membrane until a surface of the treated TFC membrane reaches a temperature of at least 75° C.

10. The process of claim 1, wherein the TFC membrane is a reverse osmosis membrane.

* * * * *